(12) United States Patent  (10) Patent No.: US 7,901,003 B2
Meeker et al.  (45) Date of Patent: Mar. 8, 2011

(54) JUVENILE CONVERTIBLE CAR SEAT

(75) Inventors: Paul K. Meeker, Hiram, OH (US);
William R. Gibson, Kent, OH (US)

(73) Assignee: Meeker R & D, Inc., Hiram, OH (US)

( * ) Notice: Subject to any disclaimer, the term of this patent is extended or adjusted under 35 U.S.C. 154(b) by 691 days.

(21) Appl. No.: 11/756,759

(22) Filed: Jun. 1, 2007

(65) Prior Publication Data

US 2007/0228788 A1   Oct. 4, 2007

Related U.S. Application Data

(60) Provisional application No. 60/806,301, filed on Jun. 30, 2006.

(51) Int. Cl.
*A47D 1/10* (2006.01)
(52) U.S. Cl. .......... 297/250.1; 297/256.1; 297/468
(58) Field of Classification Search ........... 297/250.1, 297/256.1, 467, 468, 473
See application file for complete search history.

(56) References Cited

U.S. PATENT DOCUMENTS

| | | | |
|---|---|---|---|
| 290,344 A | 12/1883 | Morris | |
| 480,822 A | 8/1892 | Mayes | |
| 2,461,367 A | 2/1949 | Bonk | |
| 2,508,822 A | 5/1950 | Goldberg | |
| 2,548,016 A | 4/1951 | Goldberg | |
| 2,634,794 A | 4/1953 | Young | |
| 2,924,266 A | 2/1960 | Goldbert | |
| 4,161,337 A | 7/1979 | Ross et al. | |
| 4,540,216 A | 9/1985 | Hassel, Sr. | |
| 4,570,510 A | 2/1986 | Babak et al. | |
| 4,640,550 A | 2/1987 | Hakansson | |
| 4,687,255 A | 8/1987 | Klanner et al. | |
| 4,746,166 A | 5/1988 | Sadan | |
| 4,818,023 A | 4/1989 | Griesemer | |
| 4,819,278 A | 4/1989 | Ramos | |
| 4,854,639 A * | 8/1989 | Burleigh et al. ........... 297/250.1 |
| 4,986,600 A | 1/1991 | Leblanc et al. | |
| 5,158,337 A | 10/1992 | Leggett | |
| 5,169,174 A | 12/1992 | Gray | |
| 5,366,271 A | 11/1994 | Johnston et al. | |
| 5,378,038 A | 1/1995 | Koyanagi et al. | |
| 5,395,154 A | 3/1995 | Wang | |
| 5,413,401 A | 5/1995 | Koyanagi | |
| 5,460,426 A | 10/1995 | Tribelsky et al. | |
| 5,472,236 A | 12/1995 | Gray | |

(Continued)

FOREIGN PATENT DOCUMENTS

DE   4137599   5/1993

(Continued)

OTHER PUBLICATIONS

European Search Report, Oct. 10, 2005.

(Continued)

*Primary Examiner* — Sarah B McPartlin
(74) *Attorney, Agent, or Firm* — Hahn Loeser & Parks LLP

(57) ABSTRACT

A car seat for transporting a child in an automobile is described which is convertible from a rear-facing infant carrier into a forward-facing toddler carrier by the inclusion or removal of a separable headrest. The car seat features a belt adjustment system as well as a crotch belt adjustment system in addition to front and rear restraint attachment components.

23 Claims, 21 Drawing Sheets

U.S. PATENT DOCUMENTS

| | | | |
|---|---|---|---|
| 5,496,092 | A | 3/1996 | Williams et al. |
| 5,551,751 | A | 9/1996 | Sedlack et al. |
| 5,564,780 | A | 10/1996 | Presser et al. |
| 5,580,125 | A | 12/1996 | Alger |
| 5,658,047 | A | 8/1997 | Ratza et al. |
| 5,678,887 | A | 10/1997 | Sher |
| 5,685,604 | A | 11/1997 | Kain |
| D387,934 | S | 12/1997 | Bear |
| 5,722,731 | A | 3/1998 | Chang |
| 5,733,004 | A | 3/1998 | Celestina-Krevh et al. |
| 5,769,495 | A | 6/1998 | Vairinen |
| 5,785,383 | A | 7/1998 | Otero |
| 5,803,543 | A | 9/1998 | Hartmann |
| 5,845,967 | A | 12/1998 | Kane et al. |
| 5,845,968 | A | 12/1998 | Lovie |
| 5,913,570 | A | 6/1999 | Yoshida et al. |
| 5,964,502 | A | 10/1999 | Stephens |
| 5,997,098 | A | 12/1999 | Coffeen |
| 6,015,190 | A | 1/2000 | Wend |
| 6,030,047 | A | 2/2000 | Kain |
| 6,079,780 | A | 6/2000 | Bapst |
| 6,135,553 | A | 10/2000 | Lovie et al. |
| 6,155,638 | A | 12/2000 | Bapst |
| 6,196,629 | B1 | 3/2001 | Onishi et al. |
| 6,273,509 | B1 | 8/2001 | Reithmeier et al. |
| 6,336,682 | B1 | 1/2002 | Rosko |
| 6,347,832 | B2 * | 2/2002 | Mori ..................... 297/256.13 |
| 6,474,735 | B1 | 11/2002 | Carnahan et al. |
| 6,478,377 | B2 | 11/2002 | Kassai et al. |
| 6,485,101 | B2 | 11/2002 | Kassai et al. |
| 6,491,348 | B1 * | 12/2002 | Kain ............................. 297/484 |
| 6,550,862 | B2 | 4/2003 | Kain |
| 6,592,183 | B2 | 7/2003 | Kain |
| 6,623,074 | B2 | 9/2003 | Asbach et al. |
| 6,685,266 | B2 | 2/2004 | James et al. |
| 6,695,412 | B2 * | 2/2004 | Barger et al. ................. 297/484 |
| 6,773,064 | B2 | 8/2004 | Treen et al. |
| 6,779,843 | B2 * | 8/2004 | Kain ......................... 297/250.1 |
| 6,857,700 | B2 * | 2/2005 | Eastman et al. ........... 297/250.1 |
| 6,913,313 | B2 | 7/2005 | Sedlack |
| 7,021,710 | B2 | 4/2006 | Kain et al. |
| 7,097,245 | B2 * | 8/2006 | Barker ..................... 297/256.14 |
| 7,427,104 | B2 * | 9/2008 | Nakhla ........................ 297/254 |
| 7,448,683 | B2 * | 11/2008 | Rikhof ...................... 297/250.1 |
| 2002/0033632 | A1 | 3/2002 | Gibson et al. |

FOREIGN PATENT DOCUMENTS

| | | |
|---|---|---|
| EP | 0 326 265 | 8/1989 |
| FR | 2 750 372 | 6/1996 |
| WO | WO0206091 | 1/2002 |
| WO | WO03/008226 | 1/2003 |
| WO | WO2005/079239 | 9/2005 |
| WO | WO2007/035386 | 3/2007 |

OTHER PUBLICATIONS

Preliminary Report on Patentability, Mar. 26, 2006.
International Preliminary Report on Patentability, Apr. 18, 2006.

* cited by examiner

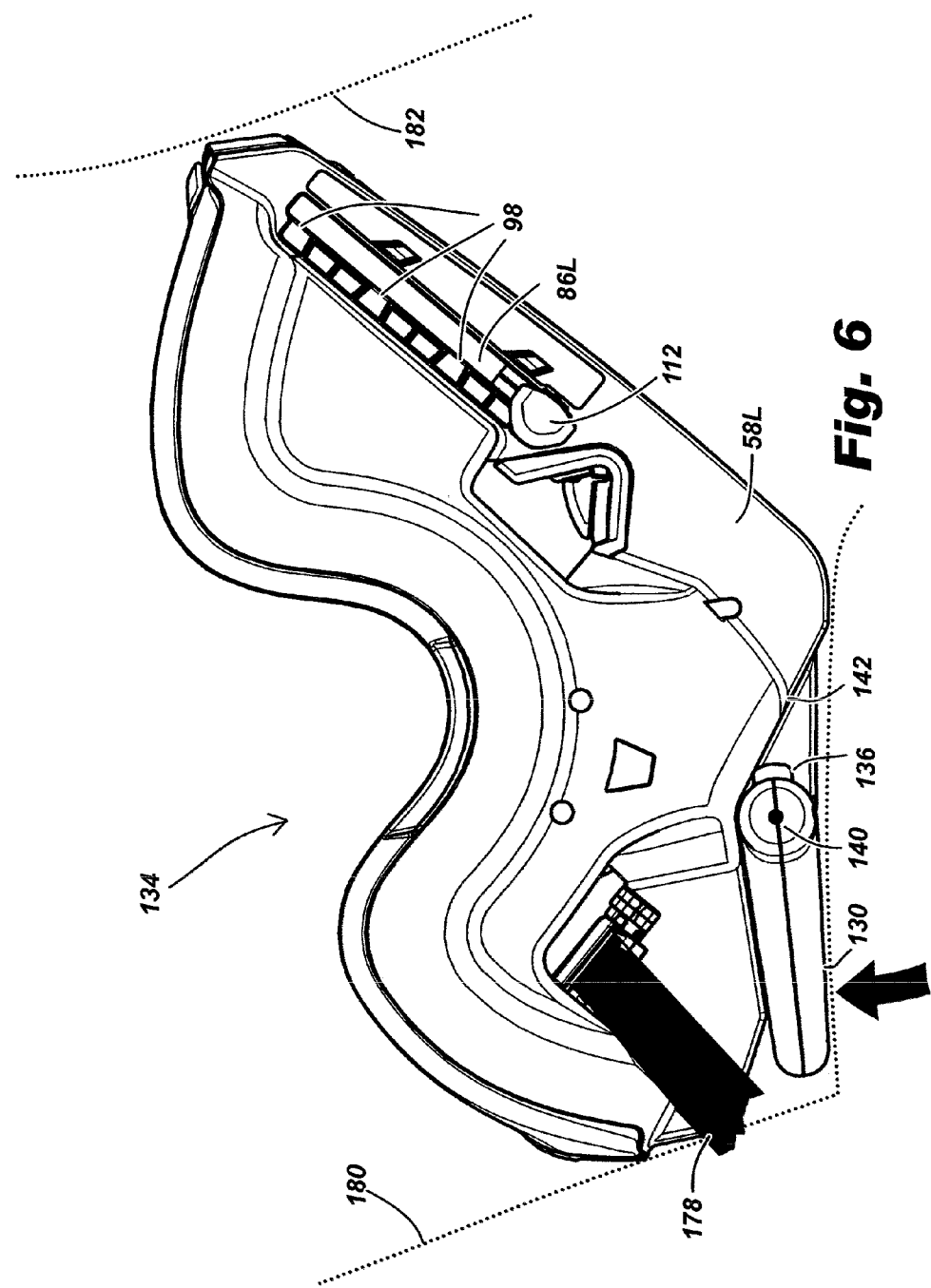

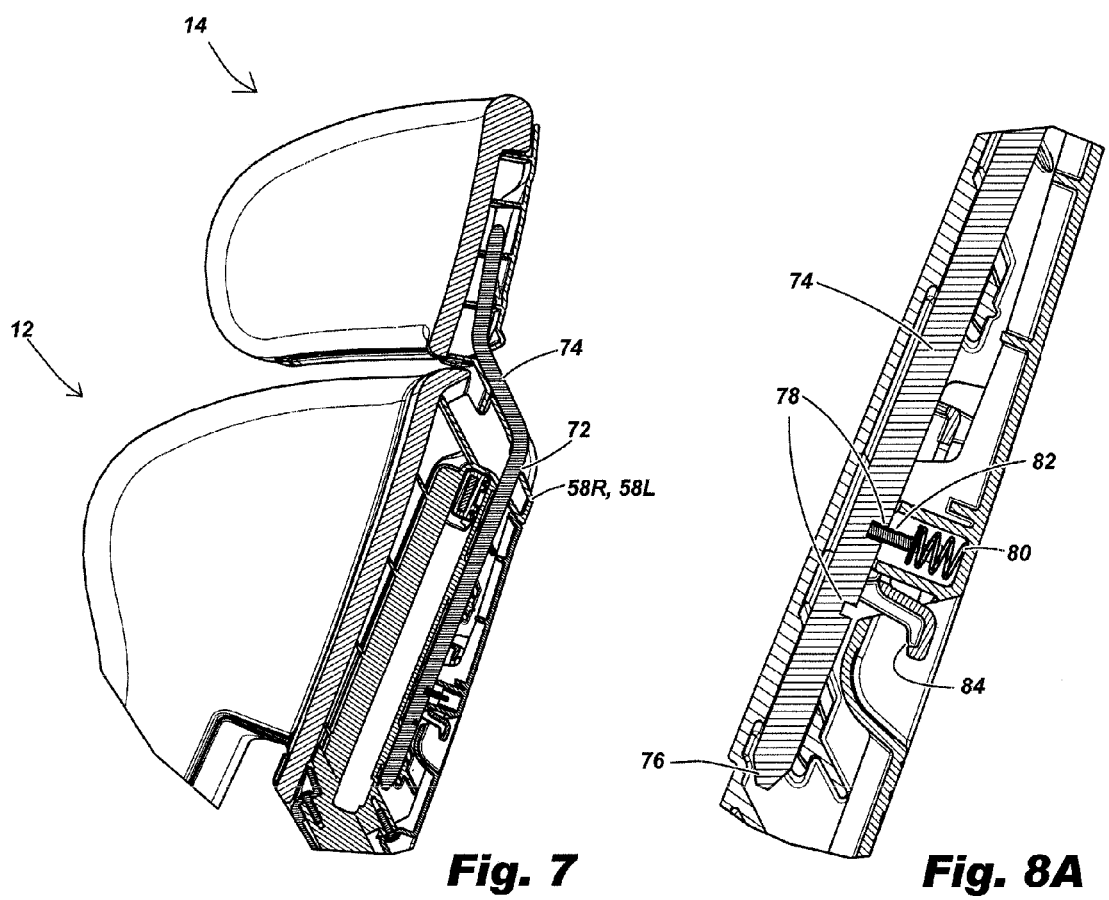

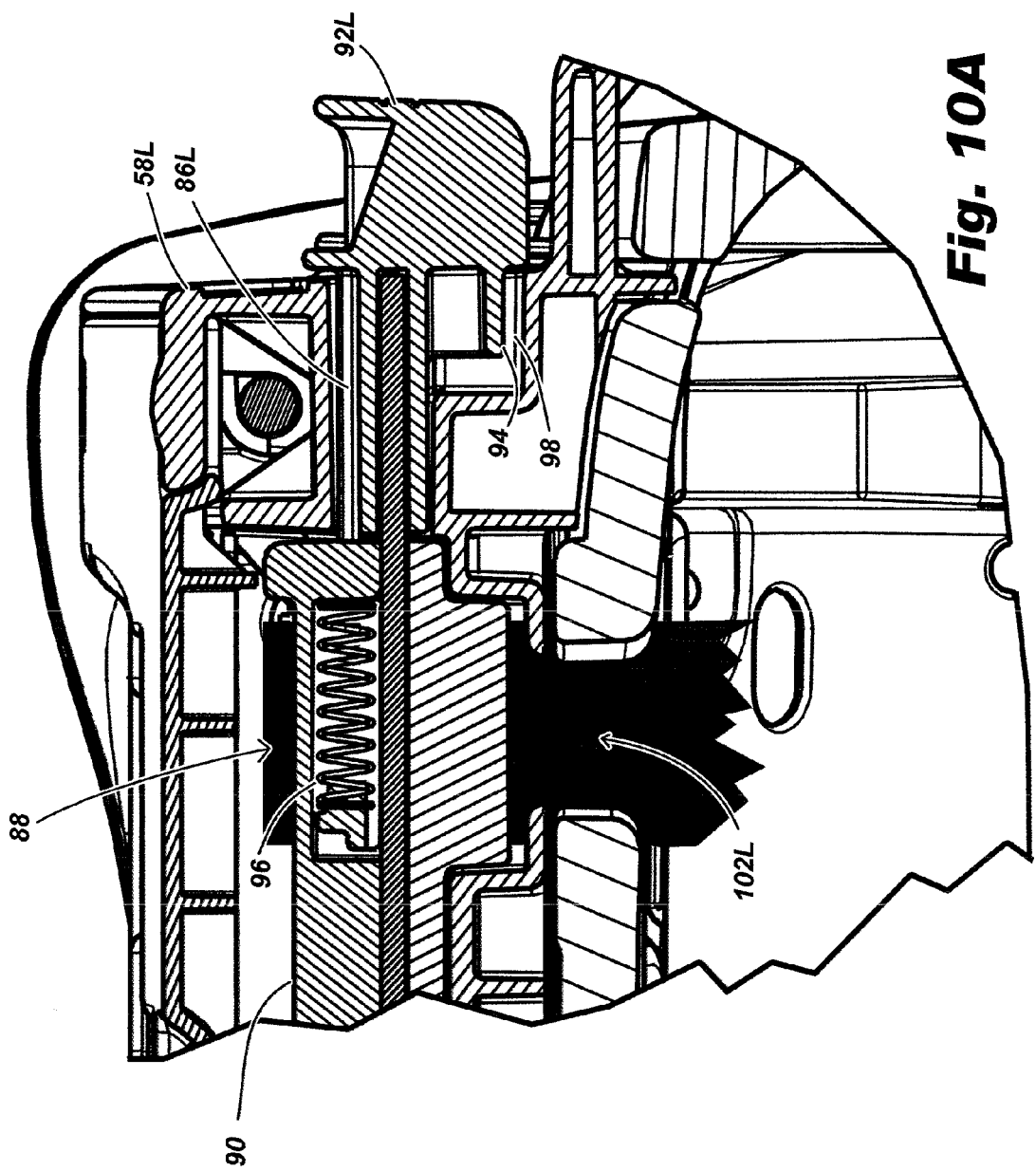

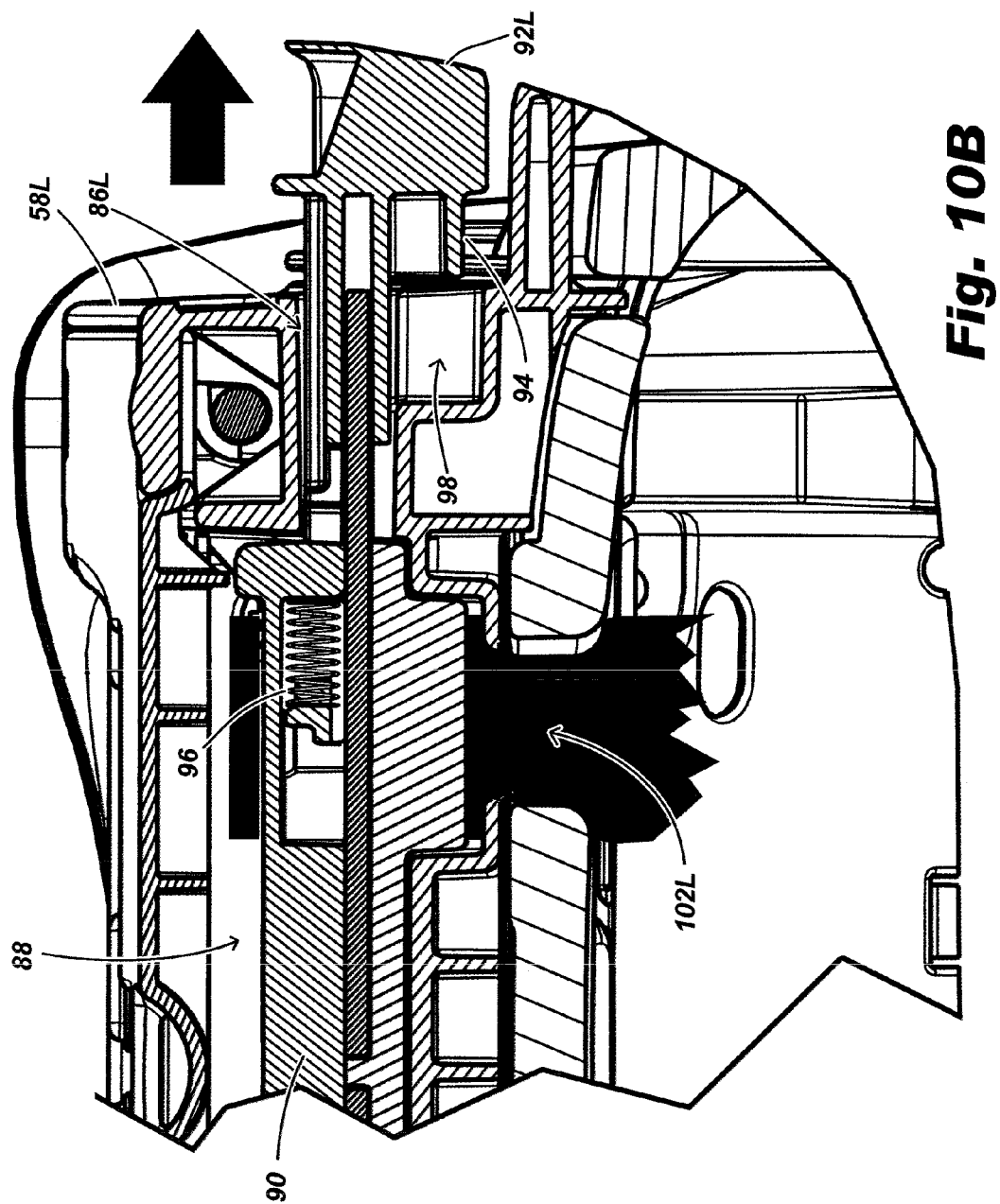

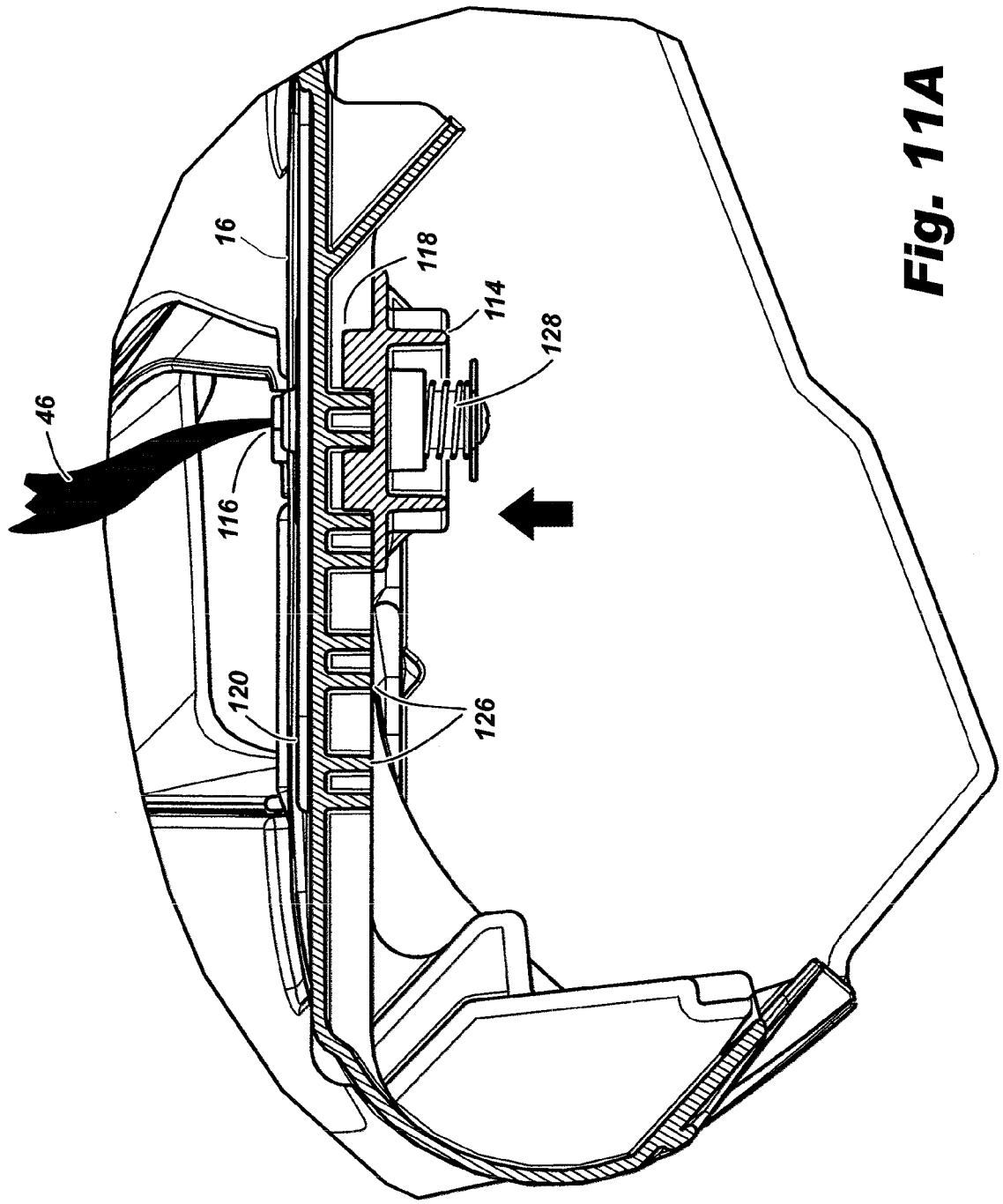

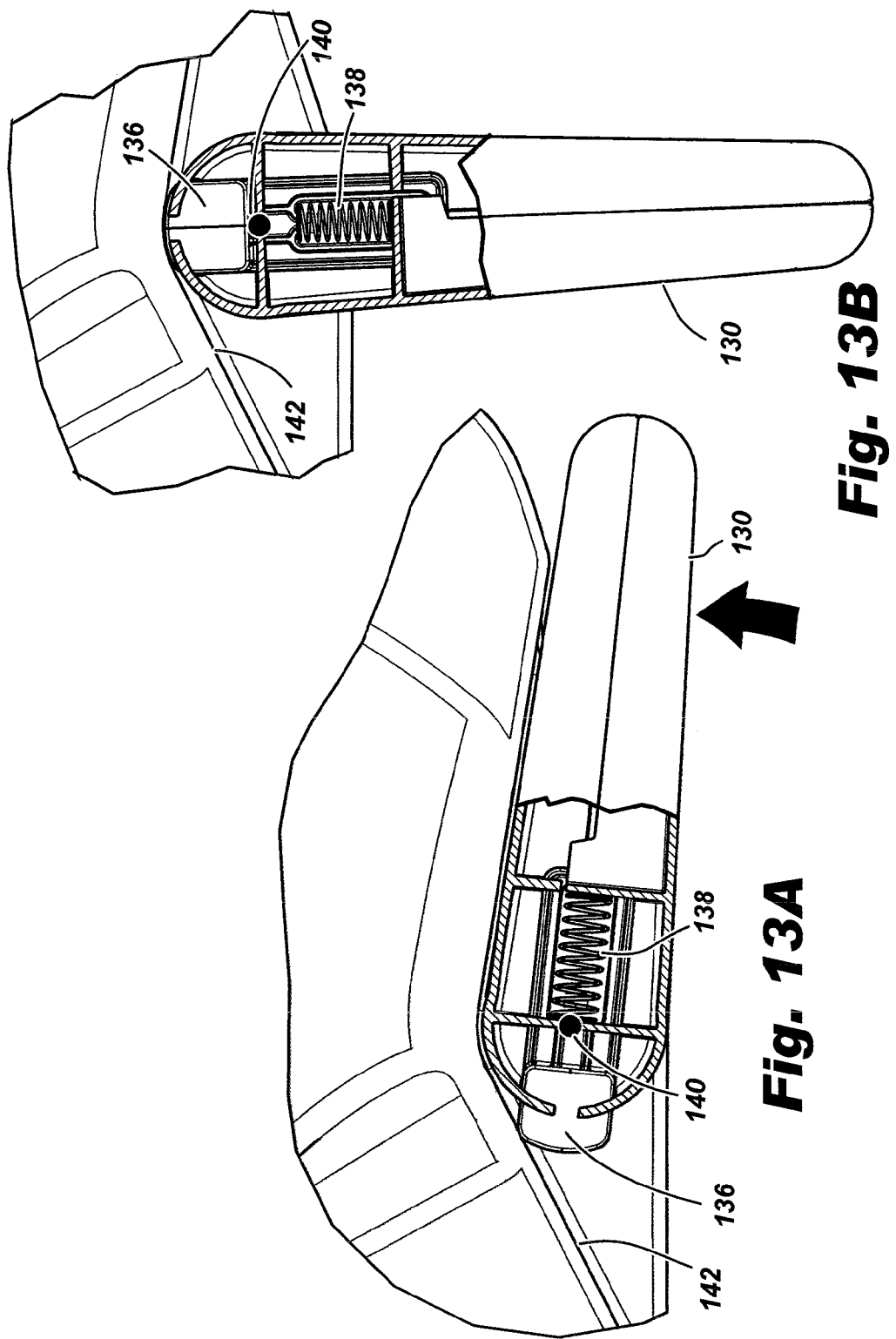

JUVENILE CONVERTIBLE CAR SEAT

TECHNICAL FIELD

This invention relates generally to a juvenile convertible car seat with a restraining harness and moveable headrest. More specifically, the invention includes adjustability of an internal harness to fit various sized and growing children in such a manner that the harness never requires disassembly and corresponding reassembly in a new position, thereby reducing the potential to misuse the product, as well as the ability to use the product over a wider age span through the ability to selectively include or remove a headrest depending on the size of the occupant.

BACKGROUND OF THE INVENTION

Juvenile convertible car seats are designed for use with growing children. These car seats are designed to convert the car seat from a rear facing and reclined position for infants (from birth up to 20, 22 or even 30 lbs.) to an upright and forward facing position for toddlers (up to 40 or even 65 lbs. or more). Convertible car seats are secured on an automobile seat with the automobile seat belt(s) threaded through specific forward or rear facing belt paths, relative to a forward or rear facing installation. Construction of a convertible car seat typically comprises of a molded plastic seat shell that is essentially a bucket seat shell with a seat and back support surface, forward extending side supports, a molded-in frame, and other details for the attachment of pads, belt systems, and other components. The belt system, or internal harness, restrains the child occupant and is generally a 5-point system with a crotch strap, two lap belts, and two shoulder belts. The belt system also includes some sort of adjuster to loosen or tighten the belts, and it is typically located at or under the front of the seat for easy access. A sewn fabric seat pad provides comfort.

The child population is increasing in weight and size relative to age and safety advocate groups are urging parents to keep children in child restraints (especially those with an internal harness) as long as possible. Therefore, convertible car seats are typically large and are getting larger to contain older and heavier children.

When used rear facing for an infant, the convertible car seat must be reclined to properly support the developing child. This creates a challenge, especially for a large convertible seat. Juvenile car seats are typically used in the back seat of an automobile and the seat back of the reclined and rear facing juvenile car seat often interferes with the seat back of the front automobile seat. This incompatibility prevents the juvenile car seat from properly reclining or even prevents its use entirely.

Harness system adjustment, specifically that of the two shoulder belts, has always been an area of misunderstanding and misuse by the consumer. Typically, juvenile car seat backs have multiple sets of slots at different heights to correspond to a growing child's shoulders. To adjust the shoulder belts from one slot to another, the consumer has to un-secure the harness and unthread the shoulder belts from the current slots and rethread them through the desired slots and then re-secure. Crotch straps on some car seats have multiple use positions also and some must be unthreaded, moved and rethreaded similar to shoulder belts. This disassembly and reassembly introduces risks to the use of the car seat as the correct and crucial reassembly relies entirely on the consumer, who may not be mechanically inclined.

Some juvenile convertible car seats have a means to slide the shoulder belts up or down to a new height without disassembly and rethreading. This is accomplished with a sliding carriage behind and/or in front of the seat back that the shoulder belts pass over or through. The shoulder belts pass through the seat back of the molded shell via a single pair of large, vertically elongated slots that correspond to the range of motion of the adjustable carriage. The carriage position is adjusted by a mechanism that is located behind the seat back and often hidden from the user and is thus non-obvious and/or difficult to use. Even fewer convertible car seats have the ability to adjust the crotch strap without disassembly, and current adjustment means are, again, non-obvious and difficult.

LATCH stands for Lower Anchorages and Tethers for Children and is an industry standard of child restraint attachment. It typically includes a length of belt with a clip at each end and an adjuster in between to adjust the length of the belt. The belt can be threaded through either the rear facing or forward facing belt paths of the convertible car seat and the clips attach to metal loops on either side of the seating area behind the seat cushion of the auto seat. The metal loops are attached to the frame of the car. With the clips attached to the loops, the LATCH belt can be adjusted tightly and the car seat is secured. The use of LATCH is optional but car seats are required to be so equipped as an alternate method of attachment to the standard auto seat belts.

Side impact performance is a growing concern with juvenile car seats, and while high sides on a seat, along with the internal harness do contain the child occupant, the juvenile car seat itself can still slide side-to-side even when properly installed. This movement is caused by the juvenile car seat sliding laterally relative to the auto belts or LATCH belt. A solution is integral belt clamps that reside within or adjacent to the rear and/or forward facing belt paths of the juvenile car seat. These clamps hold the auto or LATCH belts tight to the juvenile car seat and prevent or minimize side-to-side sliding relative to these belts.

Most convertible car seats have a recline feature that manages the seat recline position for comfort and/or proper positioning in forward or rear facing installations. Rear facing installation always requires more recline to properly support a developing infant.

It has become common for nearly all children's car seats to include at least one cup or drink holder. These take many forms and are either removable or retractable by some means.

The purpose of this invention is to solve these problems with current car seats in a practical, reliable, convenient, and cost effective manner. It will make transportation of a growing child safer and more convenient.

SUMMARY OF THE INVENTION

This invention is a juvenile convertible car seat which can be used rear facing for infants and forward facing for toddlers, in an automobile. The focus of this invention is on a reasonable fit of a large convertible car seat in an automobile (specifically rear facing) and adjustability of an internal harness to fit various sized and growing children in such a manner that the harness never requires disassembly and corresponding reassembly in a new position, which introduces potential misuse.

This convertible car seat includes a seating surface, a seat back surface, raised sides, and structural frame rails on either side behind the seat and back surfaces running nearly the length of the entire seat. The basic structure is molded in one plastic part. The sides and backrest are lined with energy absorbing foam. It also includes a 5-point internal harness as described above which is adjustable to fit various sizes of children without disassembling and rethreading the harness. The car seat also includes a recline stand, auto belt clamps, forward and rear facing belt paths, and a removable upper back section.

The removable upper back section, when removed, reduces the seat back height and minimizes interference with the front automobile seats when the car seat is installed rear-facing in a rear automobile seat. This allows a proper recline angle for an infant. The remaining non-removable back area is sufficiently large to support an infant and maintain seat structure. The removable back section of this invention incorporates portions of the forward extending sides of the car seat.

Attachment of the removable upper back section can be achieved any number of ways but in this case it is accomplished with a generally "U" shaped metal component that is fastened to the removable upper back with the legs of the "U" pointing downward. The legs of the "U" slide into the structural frame rails behind the seat back surface of the molded plastic seat shell. At least one slot is formed in at least one of the downward pointing "U" legs and is engaged by at least one spring biased tooth that resides in the corresponding structural frame rail(s) of the shell. Engagement of the tooth to the slot on the "U" leg is automatic once the legs are inserted far enough into the rails. Removal of the upper back is accomplished by applying pressure to a tooth removal lever to overcome the spring bias, disengaging the slot on the "U" leg, and sliding the upper back and its legs out of the frame rails. The removable upper back must be installed on the juvenile seat once the child is about 20 or 22 pounds to provide the additional support height necessary for the larger child.

Another advantage of the removable back is that the seat can be packaged with the removable back disassembled. This allows for a smaller box which saves warehousing and shipping costs—especially important when shipping from overseas.

The two shoulder belts of the 5-point harness system of this invention are adjusted vertically by means of a movable carriage or transverse beam located behind the seat back. The shoulder belts pass through this carriage and through two large vertical slots in the seat back, that correspond generally to the vertical range of motion of the carriage. The carriage slides generally vertically or parallel to the molded seat back between the two main structural rails located behind the seat back.

This carriage comprises of two parts that trap a pair of inwardly spring-biased plungers that extend laterally from either side of the carriage. These plungers penetrate vertical slots molded through each of the two structural frame rails. These slots allow a range of motion of the carriage and the penetrating plungers and include apertures that correspond to teeth on the plungers. The apertures and corresponding plunger teeth define the various height positions of the carriage, and ultimately, the shoulder belts passing through the carriage. The teeth are urged into the apertures via the spring bias. Each plunger includes a finger grip area that the user may utilize to pull the plunger outward, overcoming the spring and disengaging the tooth from the particular aperture. Both plungers must be pulled outward simultaneously to disengage the teeth on both structural frame rails and then moved, along with the carriage, to a desired height and new set of apertures. Releasing the plungers allows the springs to urge the teeth inward into the new set of apertures, latching the carriage into the new position. Because the vertical slots and apertures are located on the outside of the structural frame rails, the user can make the desired shoulder belt height adjustment without uninstalling the car seat and can visually confirm what position the carriage is in and that the teeth on the plungers are fully engaged.

The two vertical shoulder belt slots in the seat back surface are unique from the equivalent slots of other car seats in that their shape is such that no cover plate is required in the occupant area. Each of the two vertical slots is actually a series of generally horizontal belt slots located at corresponding positions to where the shoulder belts pass through the carriage as positioned by the latching apertures on the main shell rails. The number of the horizontal belt slots is the same number of latching apertures. The series of slots is connected by a narrow central slot of approximately 1" in width and the edges are angled at approximately 45° to transition smoothly into the horizontal belt slots. All corners are rounded such that the connecting slots assume a wave-like shape on each side. The wave-like sides of the connecting slots allow the shoulder belts to slide easily from position to position (by means of the carriage) eliminating or greatly reducing the chance that the belt will "hang" as the position is changed. The central connecting slot is narrow to preserve as much of the back seating surface as possible and therefore eliminating the need for any kind of cover plate in front of the slots.

The crotch strap is also adjustable away from or closer to the back surface without any disassembly. This is accomplished with a large hole molded in the seat surface of the shell with a series of teeth under the seating surface on either side of the hole. A sliding cover plate on the inside of the seat covers the large hole. A crotch strap receiver part with a raised center section with a slot to receive the crotch strap is slideably attached to the bottom of the cover plate up through the hole in the shell such that the raised center section penetrates a smaller hole in the cover plate. The cover plate and crotch strap receiver are biased toward each other via two springs secured to the cover plate. The crotch strap receiver has teeth that correspond and engage teeth on the shell via the spring bias. To adjust, the user grips the bottom of the crotch strap on the raised center section of the crotch strap receiver, pushes down to disengage the teeth and slides the crotch strap, crotch strap receiver, and cover plate to the desired position. The spring bias urges the teeth of the crotch strap receiver and the shell to engage at whatever position the crotch strap receiver is moved. The top cover plate simply slides along the seating surface and provides cover for the large hole. The large hole in the shell defines the overall range of motion of the crotch strap receiver and ultimately, the crotch strap.

The recline of this convertible car seat is achieved by means of a pivoting U-shaped arm with a horizontal beam and two legs terminating in hubs located under the shell. The arm pivots via a lug on each hub of the arm that penetrates a corresponding hole molded on the outside of each structural shell rail. The recline arm pivots rearward or forward to either recline or make the seat upright. The arm is retained in either reclined or upright position via an outwardly spring biased plunger located at the end of each hub. The shell in this area is shaped such that the outwardly biased plungers create an interference with the shell, holding the recline arm in place in either position. The spring bias is only strong enough to hold the recline arm in place and is easy to overcome by the user who only has to rotate the arm out of one position, which compresses the springs and moves the plungers out of the way, and allows the arm to swing to the next position where the biased plungers again retain arm position.

The forward facing auto and LATCH belt path is located about a third of the way up the seat back surface and is situated in front of the two main structural rails of the seat. It is defined by a trough and an opening at either end to allow threading of the auto or LATCH belts. This trough is open to the front. To further strengthen the belt path, a filler component is attached to the front of the trough and closes it, making a double-walled structural box. The filler also covers structural shell ribs as well as smoothing and further defining the belt path. A belt clamp at the center of the belt path filler compresses on the auto or LATCH belts and prevents unwanted side to side motion of the car seat relative to the auto seat and belts. This clamp consists of two parts, a lock arm and a cam that interacts with the filler component. The lock arm is pivotally attached to the belt path filler part just below where the auto belt(s) lie. The cam component is pivotally attached to the opposite end of the lock arm. With the auto or LATCH belts in place, the user pivots the lock arm down over the belt(s) and rotates the cam down which engages two lugs on the cam part with two ledges molded onto the filler part. The interaction of the cam lugs with the ledges keeps the lock arm closed, and maintains pressure on the auto or LATCH belts.

The rear facing auto and LATCH belt path is located at the front of the convertible car seat, just forward of the crotch strap attachment and on the seating surface. It is defined by openings in the vertical walls on either side of the seating surface that direct the auto or LATCH belts laterally over the seating surface and through each opening. Adjacent to each of these openings is a recess. Inside each recess is a belt clamp assembly that encompasses the width of the recess which closes the opening and strengthens the path in this area. Pivotally attached at the front of the clamp assembly base is a lock arm. Pivotally attached to the rear of the clamp assembly base is a cam. The pivot axis of this cam is perpendicular to that of the lock arm axis. The auto or LATCH belts are threaded through the belt path, and over the clamp assembly base. To clamp the auto or LATCH belts, the user pivots the lock arm component down over the belts and rotates the cam part over the end of the lock arm opposite its attachment to the clamp base. The cam interaction with the lock arm relative to the clamp base keeps the lock arm closed and maintains pressure on the auto or LATCH belts. The other end of the belt path, on the opposite side of the seat is a mirror image of this clamp base/lock arm/cam assembly. Both forward facing and rear facing belt clamps minimize unwanted side to side motion of the juvenile car seat relative to the auto seat when clamped onto the auto or LATCH belts.

The LATCH belt assembly can be stored inside the convertible car seat when not in use inside two wells located to the rear and at either side of the seating surface. A small tether belt attaches the LATCH belt assembly permanently to the interior of the car seat shell. This tether is long enough to allow the LATCH belt assembly to reach both the rear facing and forward facing belt paths, where it can be used to secure the convertible car seat.

These and other objects of the present invention will become more readily apparent from a reading of the following detailed description in conjunction with the accompanying drawings, wherein like reference numerals indicate similar parts, and with further reference to the appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 6 is a left side view of the convertible car seat in reclined, rear facing configuration on an automobile seat, with upper back removed;

FIG. 7 is a close up view of FIG. 5 showing a cut-away section of the metal legs of the removable back inserted into the shell rail;

FIG. 8A is a close up of FIG. 7 showing detail of removable upper back retention spring and tooth engaging metal leg of the upper back;

FIG. 10A is a cut-away section through the spring-biased plunger mechanism of the shoulder belt carriage showing penetration and engagement of the left plunger into the left shell rail;

FIG. 10B is a cut-away section through the spring-biased plunger mechanism of the shoulder belt carriage showing disengagement of the left plunger from the left shell rail with spring compressed;

FIG. 11A is a cut-away section through the crotch belt receiver teeth and corresponding shell teeth showing engagement in the rearmost position;

FIG. 13A is a close-up view of FIG. 5 showing the recline leg in upright, forward facing position with plunger and corresponding spring exposed;

FIG. 13B is a close-up left side view with recline leg in between reclined and upright position with plunger and corresponding compressed spring exposed;

DETAILED DESCRIPTION OF THE INVENTION

Figure 1:
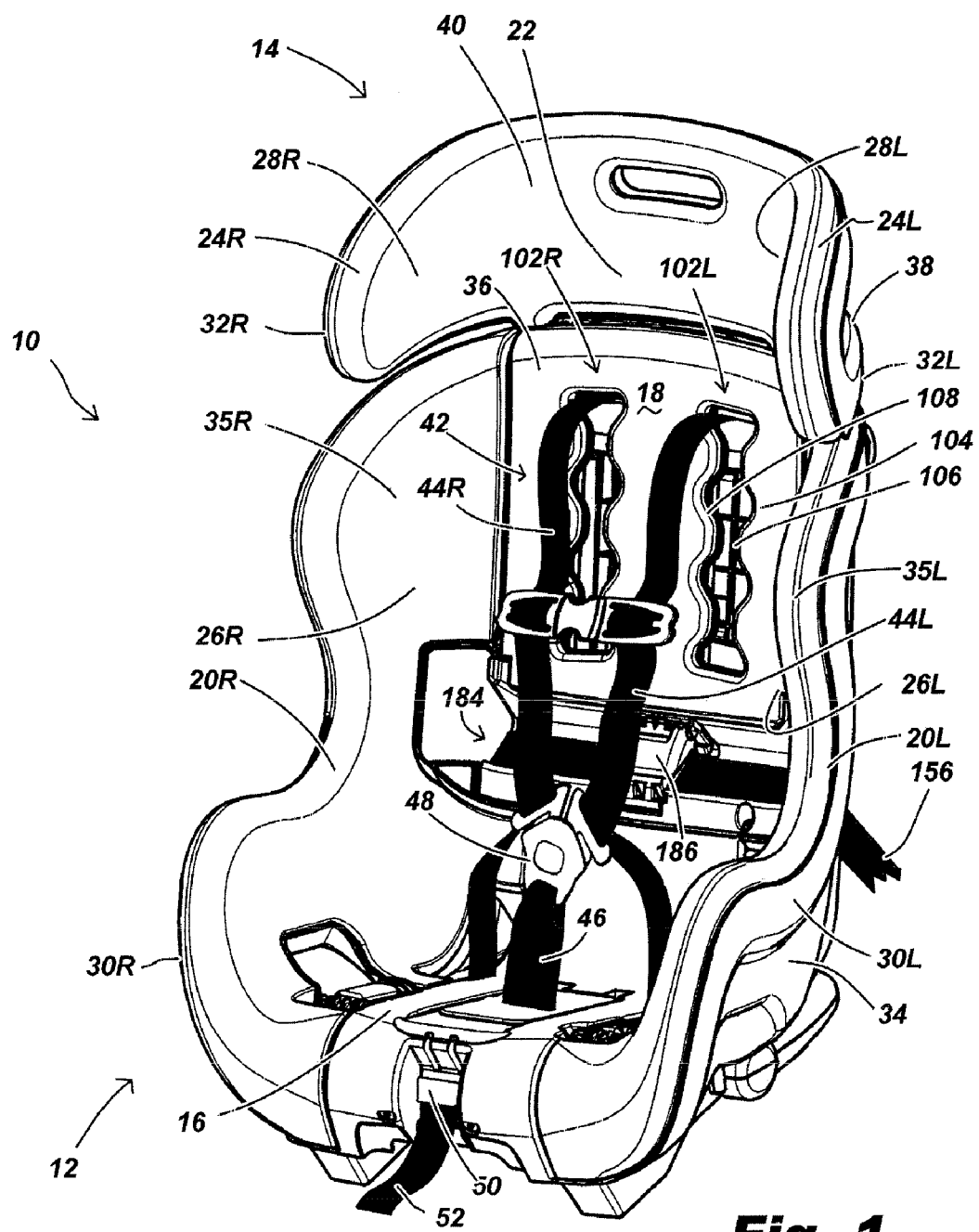
FIG. 1 is a front perspective of the convertible car seat in upright, forward facing configuration with upper back attached.

Referring now to the drawings wherein the showings are for purposes of illustrating the preferred embodiment of the invention only and not for purposes of limiting the same. The figures show a convertible car seat with a detachable upper back to allow a proper rear facing installation in an auto as well as for the benefit of a smaller package size and with an adjustable shoulder harness mechanism that never requires rethreading of the harness and which can be adjusted from the front of the car seat when installed on an automobile seat, as well as other inventions.

As illustrated in FIG. 1, convertible car seat 10 has two major components, seat shell assembly 12 and removable upper back assembly 14. Seat shell assembly 12 incorporates a seating surface 16, a back surface 18 which are generally perpendicular to one another, and adjacent raised right side 20R and raised left side 20L. Raised sides 20R and 20L incorporate inner surfaces 26R and 26L respectively, and outer surfaces 30R and 30L respectively Inner surfaces 26R and 26L form the main inside contours of respective energy absorbing foam components 35R and 35L that span the entire inner side surfaces of seat shell assembly 12. Back surface 18 defines the main outer contour of energy absorbing foam component 36 that covers the upper interior back surface of seat assembly 12.

Removable upper back assembly 14 incorporates a back surface 22 and adjacent raised right side 24R and raised left side 24L. Raised sides 24R and 24L incorporate inner surfaces 28R and 28L respectively, and outer surfaces 32R and 32L respectively. Inner surfaces 28R and 28L and back surface 22 form the inner contour of energy absorbing foam liner 40 which spans the entire interior of upper back assembly 14.

Removable upper back surface 22 is essentially an extension of seat shell assembly back surface 18. Removable back inner surfaces 28R and 28L of raised sides 24R and 24L are essentially extensions of seat shell assembly 12 inner surfaces 26R and 26L of raised sides 20R and 20L.

Internal harness 42 includes shoulder/lap belts 44R and 44L, crotch belt 46 and buckle/latch assembly 48. Harness adjuster 50 is located in front and directly below seating surface 16 where it is easily accessed. Tightening internal harness 42 is achieved by pulling adjuster belt 52 through the adjuster 50, which is connected to and pulls on the shoulder/lap belts 44R and 44L better illustrated in FIG. 2. Loosening the harness is done by lifting a lever on the adjuster 50 and pulling on the shoulder belts which pulls adjuster belt 52 back into the adjuster 50.

A sewn pad covers the majority of the car seat, but it is not shown for clarity.

Figure 2:
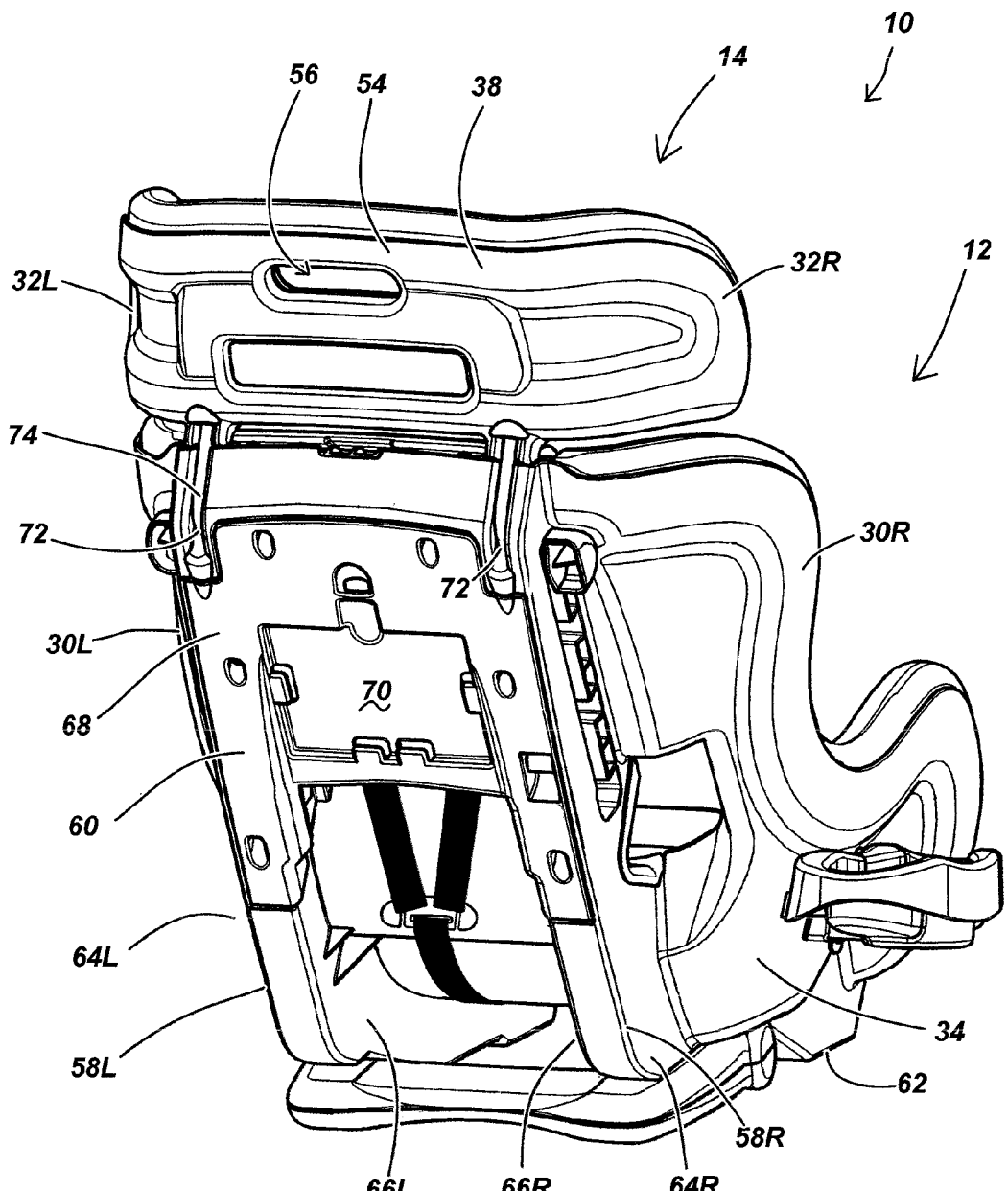
FIG. 2 is a rear perspective of the convertible car seat in upright, forward facing configuration with upper back attached.

Removable upper back outer surfaces 32R and 32L are essentially extensions of seat shell assembly outer surfaces 30R and 30L, respectively, as shown in FIG. 2 Upper back outer surfaces 32R and 32L are joined together by the central rear surface 54. These three surfaces define the essential shape of the plastic upper back component 38 of the upper back assembly 14. Both rear surface 54 of the plastic upper back 38 and back surface 22 of the removable upper back 14 foam liner 40 are penetrated by hand grip 56.

Figure 4:
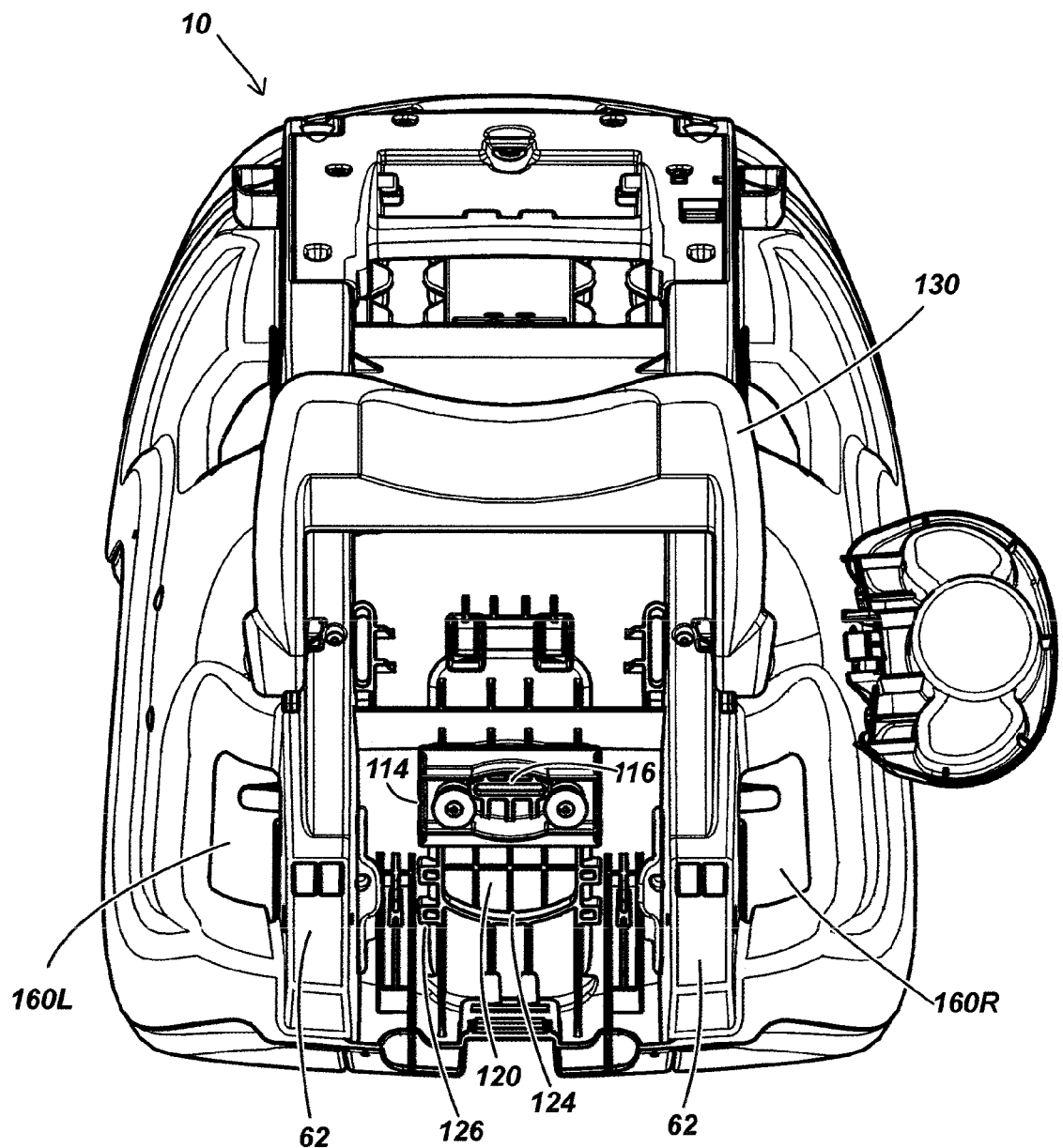
FIG. 4 is a bottom view of the convertible car seat in upright, forward facing configuration.

Seat shell assembly 12 outer surfaces 30R and 30L are intersected by main rails 58R and 58L located behind back surface 18 and below seating surface 16. Main rails 58R and 58L share rear contoured surface 60, bottom contoured surface 62 (also shown in FIG. 4), and also include inner surfaces 66R and 66L and outer surfaces 64R and 64L, respectively. Inner surfaces 66R and 66L extend upward under the seat and are bridged by seating surface 16. This combination of surfaces defines the essential form of the main molded plastic seat shell 34.

Figure 8B:
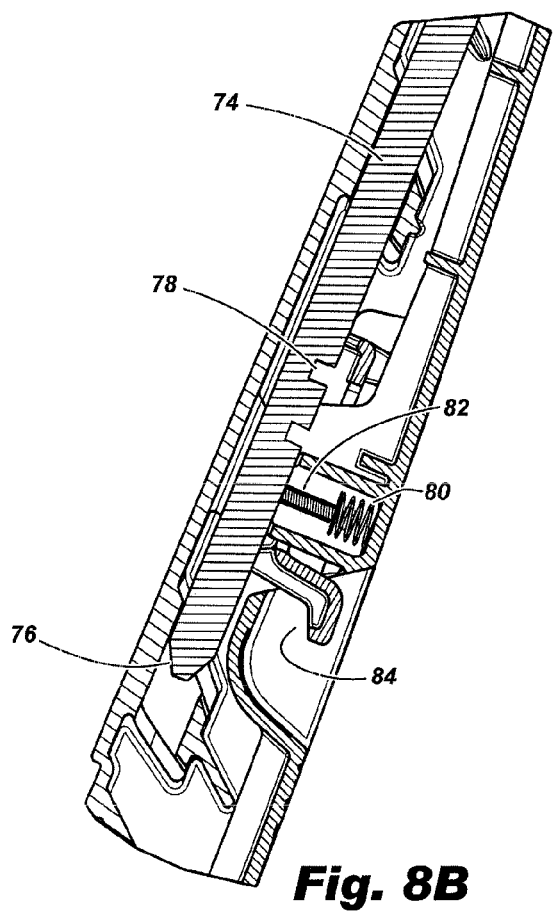
FIG. 8B is the same view as FIG. 8A but with metal leg of removable upper back partially disengaged from the tooth.
Figure 8C:
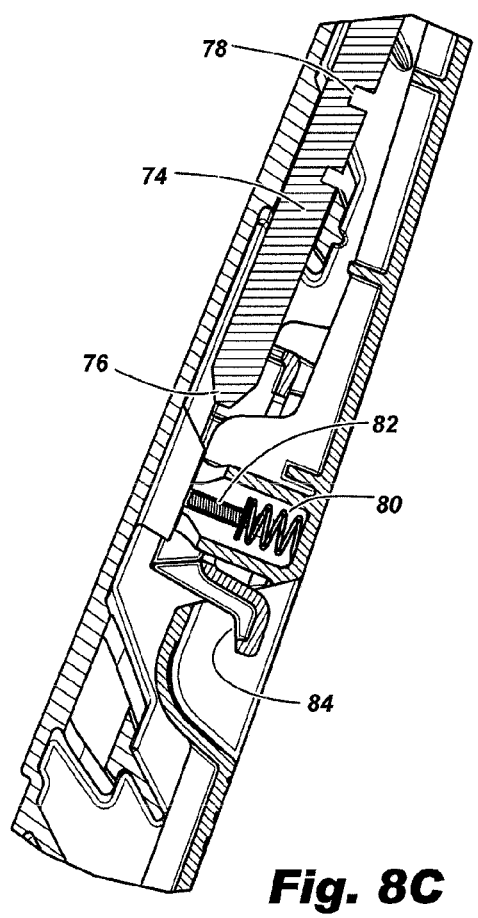
FIG. 8C is the same view as FIG. 8A but with metal leg of removable upper back disengaged and showing no contact with the tooth.

Rear rail cover 68 connects main rails 58R and 58L and shares rear surface 60 with them. Rear cover 68 includes instruction storage recess 70. Apertures 72 are located near the top of main rails 58R and 58L and accept angled metal component 74 of removable upper back assembly 14. FIG. 7 illustrates metal component 74 inserted through aperture 72 and down inside main rail 58R/58L. FIG. 8A more clearly shows spring 80 biasing tooth 82 into slot or notch 78 on metal component 74. When metal component 74 is inserted into main rails 58R and 58L (better illustrated in FIG. 8C), angled tip 76 acts on tooth 82, moving it out of the way and overcoming the bias of spring 80 (see FIG. 8B) to allow metal component 74 to pass far enough for alignment and consequential biased engagement of tooth 82 with slot 78. Tooth removal lever 84 may be pulled to disengage tooth 82 from slot 78, compressing spring 80, for removal of metal component 74 from main rails 58R and 58L, also shown in FIGS. 8B and 8C.

Figure 5:
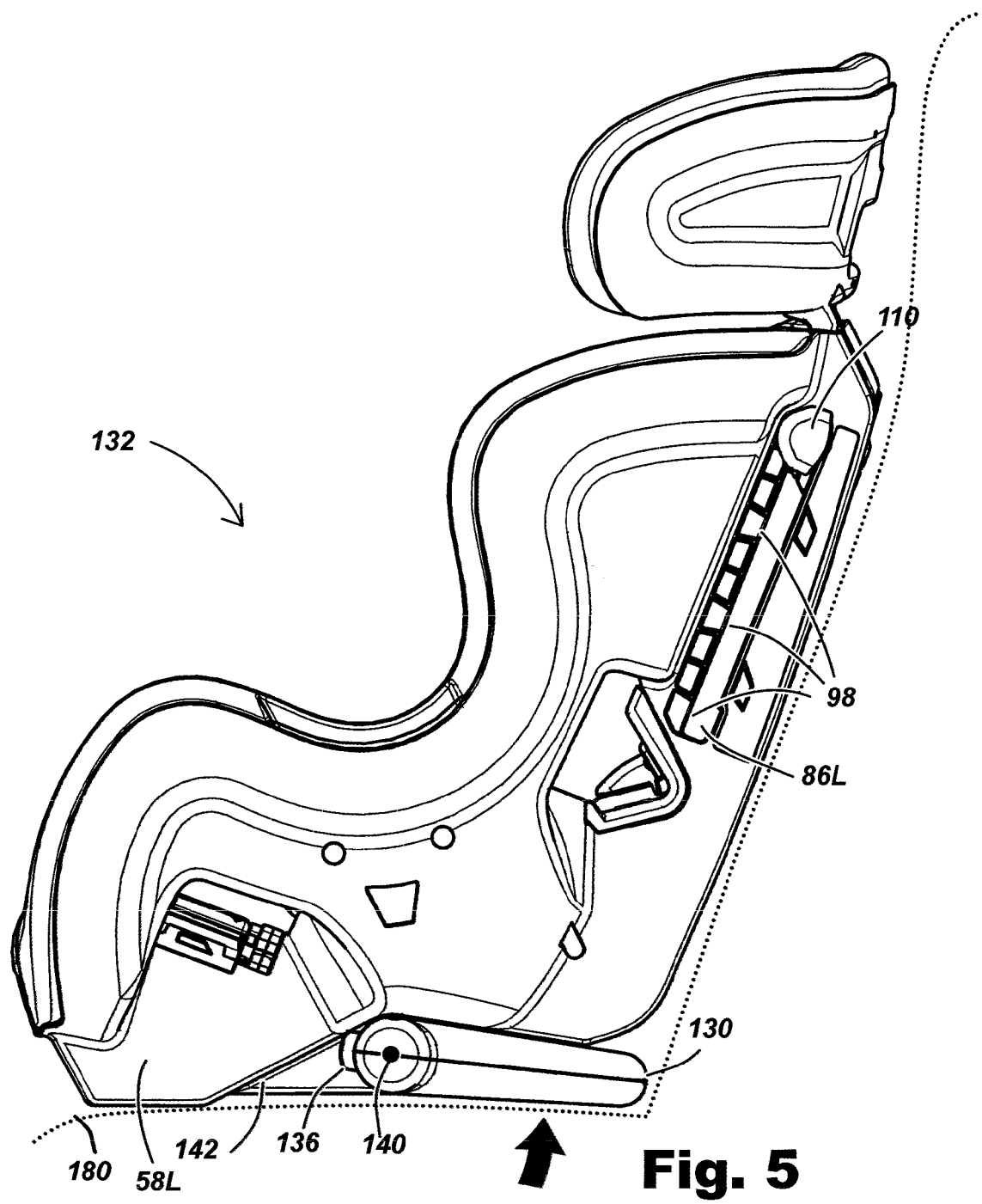
FIG. 5 is a left side view of the convertible car seat installed in upright, forward facing configuration on an automobile seat.
Figure 9:
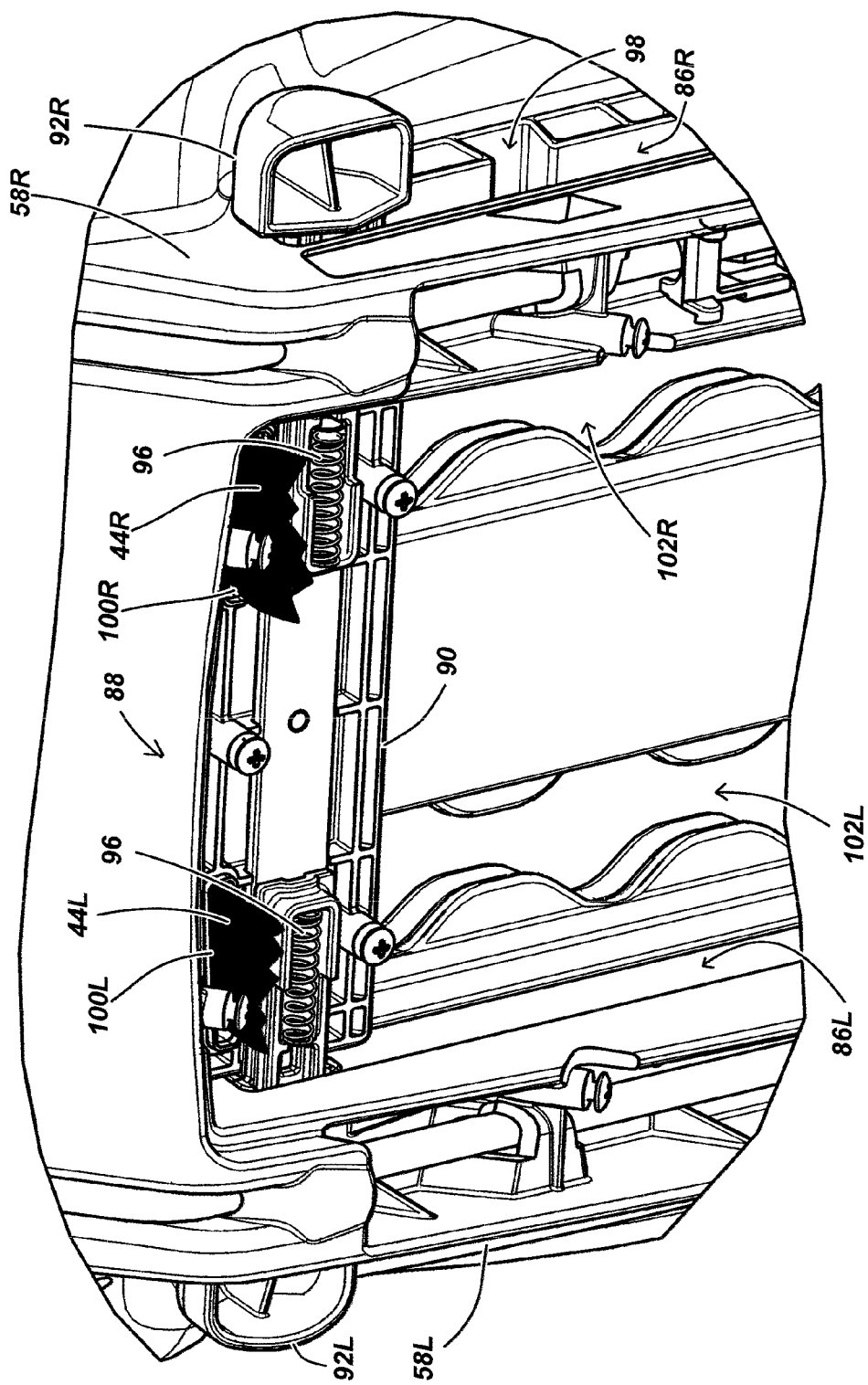
FIG. 9 is a close up view of FIG. 2 with the rear cover removed to expose moveable shoulder belt carriage with carriage cover also removed to expose spring-biased plunger mechanism at rest.

Movable shoulder belt carriage assembly 88 (synonymously moveable transverse adjustment beam) shown in FIG. 9, manages the height of shoulder belts 44R and 44L. Shoulder belts 44R and 44L pass through slots 100R and 100L in moveable carriage body 90 that lies between main rails 58R and 58L. Plungers 92R and 92L extend laterally from either end of carriage body 90 and penetrate substantially vertical slots 86R and 86L in main rails 58R and 58L. Springs 96 bias plungers 92R and 92L inward relative to carriage body 90 and drive tooth 94 located on each plunger 92R and 92L (FIG. 10A, 10B) into recesses 98 located adjacent to vertical slots 86R and 86L in main rails 58R and 58L. A series of generally evenly spaced recesses 98 adjacent to vertical slots 86R and 86L (see FIGS. 5-6) define the alternative vertical positions of carriage assembly 88, and ultimately the vertical positions of shoulder belts 44R and 44L within the global range of adjustability permitted by vertical slots 86R and 86L. FIG. 5 illustrates the highest position 110 while FIG. 6 illustrates the lowest position 112. Adjusting the height of the shoulder belt carriage assembly 88 requires that both plungers 92R and 92L be pulled outward simultaneously, overcoming biasing springs 96 and disengaging tooth 94 located on each plunger 92R and 92L from current position recesses 98 as shown in FIG. 10B. The shoulder belt carriage assembly 88 can then be raised or lowered to the desired position where tooth 94 from each plunger 92R and 92L can align and engage with another position of recess 98 via the bias of spring 96 as shown in FIG. 10A.

FIG. 1 shows right and left shoulder belt slots 102R and 102L. Each generally vertical slot 102R and 102L includes multiple generally horizontal shoulder belt slots 104, a narrow and generally vertical connecting slot 106, and transition ramps 108 forming an hourglass arrangement. The number and vertical position of horizontal slots 104 corresponds directly to the number and vertical position of recesses 98 adjacent to vertical slots 86R and 86L in main rails 58R and 58L. Narrow connecting slot 106 allows shoulder belts 44R and 44L to slide from one set of horizontal shoulder belt slots 104 to the next set of slots 104, by means of movable shoulder belt carriage assembly 88, without requiring that vertical slots 102R and 102L be as wide as horizontal slots 104 along their entire length. The narrow areas of connecting slot 106 between the horizontal slot 104 positions preserve and maximize back surface 18 to increase occupant support and comfort and eliminate the need for any type of cover plate to conceal what would be larger voids. Transition ramps 108 allow the shoulder belts to slide easily through the narrow connecting slot 106, as shoulder belt height is adjusted from position to position, and reduces the chances of the shoulder belts "hanging up".

Figure 11B:
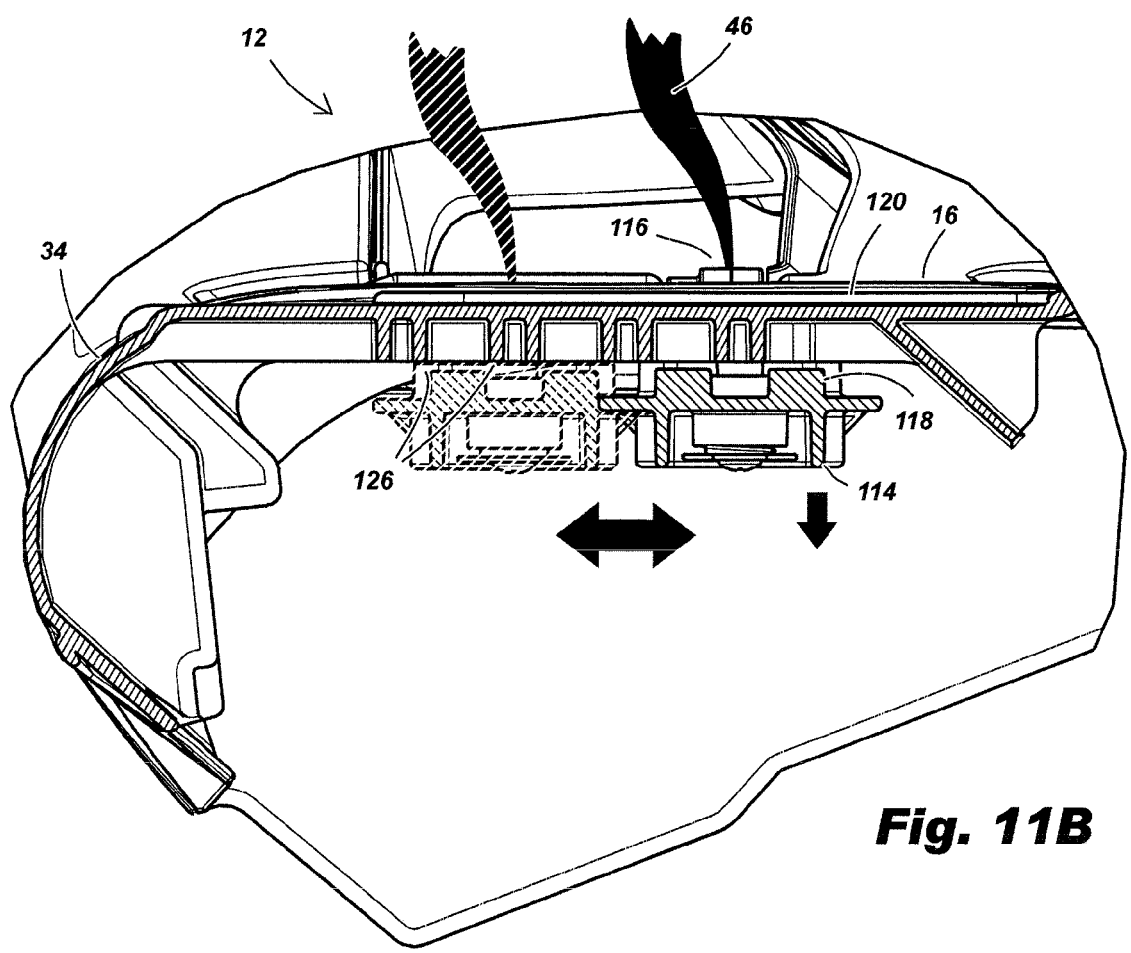
FIG. 11B is a cut-away section through the crotch belt receiver teeth and corresponding shell teeth showing disengagement and a phantom of an alternate position.
Figure 12A:
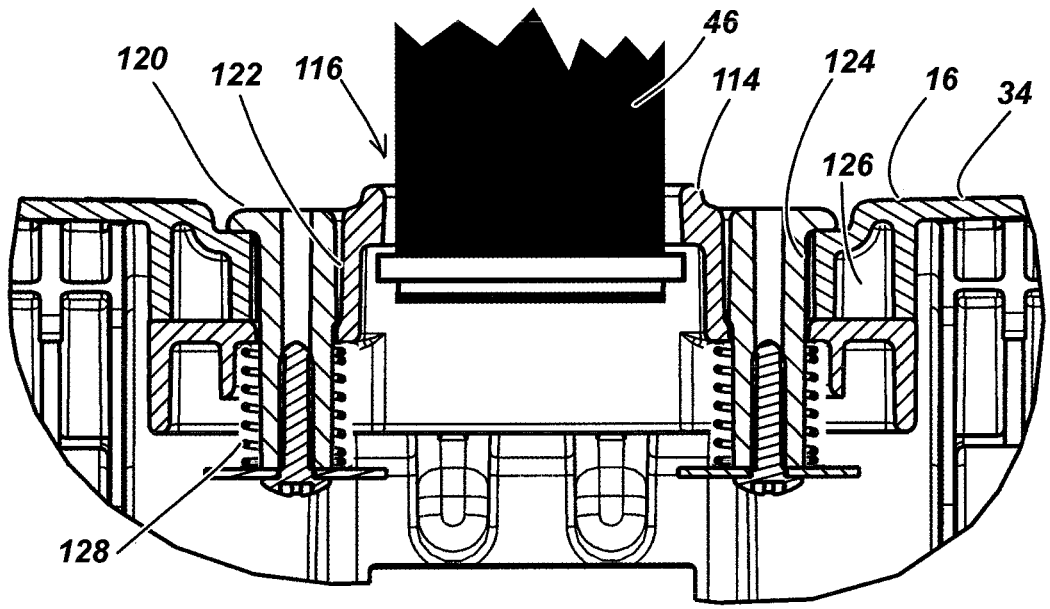
FIG. 12A is a cut-away section through the crotch belt showing retention within the crotch belt receiver that is spring biased up towards the cover plate.
Figure 12B:
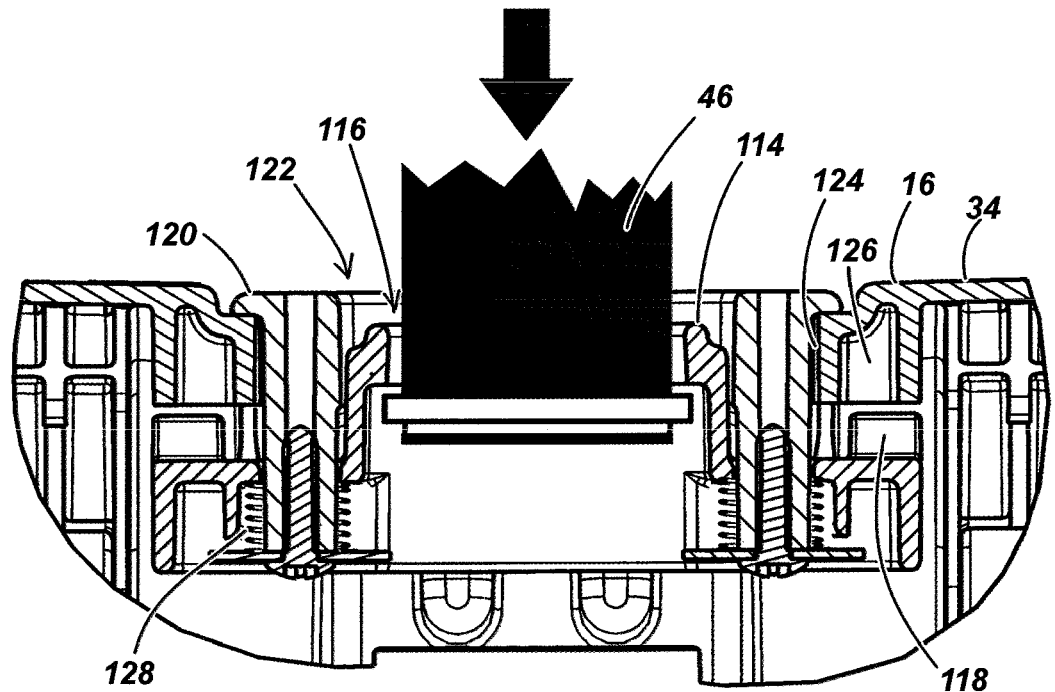
FIG. 12B is a cut-away section through the crotch belt showing the crotch belt receiver depressed, with springs compressed, and receiver teeth disengaged from shell teeth.

Crotch belt 46 is adjustable away from or closer to back surface 18 of seat shell assembly 12 and best illustrated in FIGS. 11A and 11B, and FIGS. 12A and 12B. Crotch belt 46 is attached to belt receiver 114 through crotch slot 116. Belt receiver 114 attaches below seating surface 16 and extends up through large opening 124 (also shown in FIG. 4) in seating surface 16 of seat shell assembly 12 and through smaller opening 122 in cover plate 120 (also shown in FIG. 3). Belt receiver 114 is coupled to and biased by springs 128, upward, toward cover plate 120, essentially sandwiching this area of seat shell 34. Belt receiver 114 incorporates teeth 118 on each side that are sized and spaced to correspond with teeth 126 located underneath seating surface 16 that flank either side of large opening 124. The bias of springs 128 on belt receiver 114 up toward cover plate 120 also biases crotch belt receiver teeth 118 up and into seat shell teeth 126. This biased engagement maintains position of belt receiver 114 and ultimately, crotch belt 46. Adjustment of crotch strap 46 position is accomplished by gripping the base of strap 46 where it enters belt receiver 114 at crotch slot 116, and pushing down on receiver 114 to overcome the bias of springs 128 with cover plate 120 and disengaging the teeth 118 of receiver 114 from seat shell teeth 126 (FIGS. 11B, 12B). With teeth disengaged, the belt receiver 118 and crotch belt 46 can be moved to a new position where teeth 118 of receiver 114 can align with and engage different shell teeth 126 by means of springs 128 as illustrated in FIG. 11B.

Recline leg 130 manages the forward facing position 132 (FIG. 5) and rear facing position 134 (FIG. 6) of convertible car seat 10. Recline leg 130 is rotatably attached to main rails 58R and 58L at pivot axis 140. Adjacent to the attachment and pivot axis 140 of recline leg 130 is a recess defined by contoured surface 142 in both main rails 58R and 58L. Surface 142 is formed such that it limits the range of motion for recline leg 130 and defines upright position 132 where recline leg 130 supports the rear of convertible car seat 10 as illustrated in FIG. 5 and reclined position 134 where recline leg 130 supports the front of convertible car seat 10 as illustrated in FIG. 6. Each side of recline leg 130 contains a sliding plunger 136 that is biased by springs 138 beyond the envelope of recline leg 130. The bias of springs 138 forces plungers 136 to interfere with contoured surface 142, maintaining recline leg 130 in either upright position 132 (also shown in FIG. 13A) or reclined position 134, and preventing it from flopping freely between the two positions. The bias of springs 138 is only enough to support the weight of recline leg 130 itself, and is easily overcome by a consumer grasping and rotating recline leg 130 to change position. FIG. 13B illustrates recline leg 130 in between positions 132 and 134 with plunger 136 forced inside recline leg 130, with spring 138 compressed and sliding along surface 142 until recline leg 130 is rotated to either position 132 or 134.

FIG. 5 illustrates automobile seat 180 and the interaction with convertible car seat 10 in forward facing position 132.

FIG. 6 illustrates automobile seat 180 and the interaction with convertible car seat 10 in rear facing position 134 and front automobile seat back 182 in close proximity to the top convertible car seat 10. If removable upper back assembly 14 were installed on car seat 10, it would likely interfere with front automobile seat back 182 and prevent car seat 10 from installing properly on automobile seat 180 in rear facing position 134.

Figure 14A:
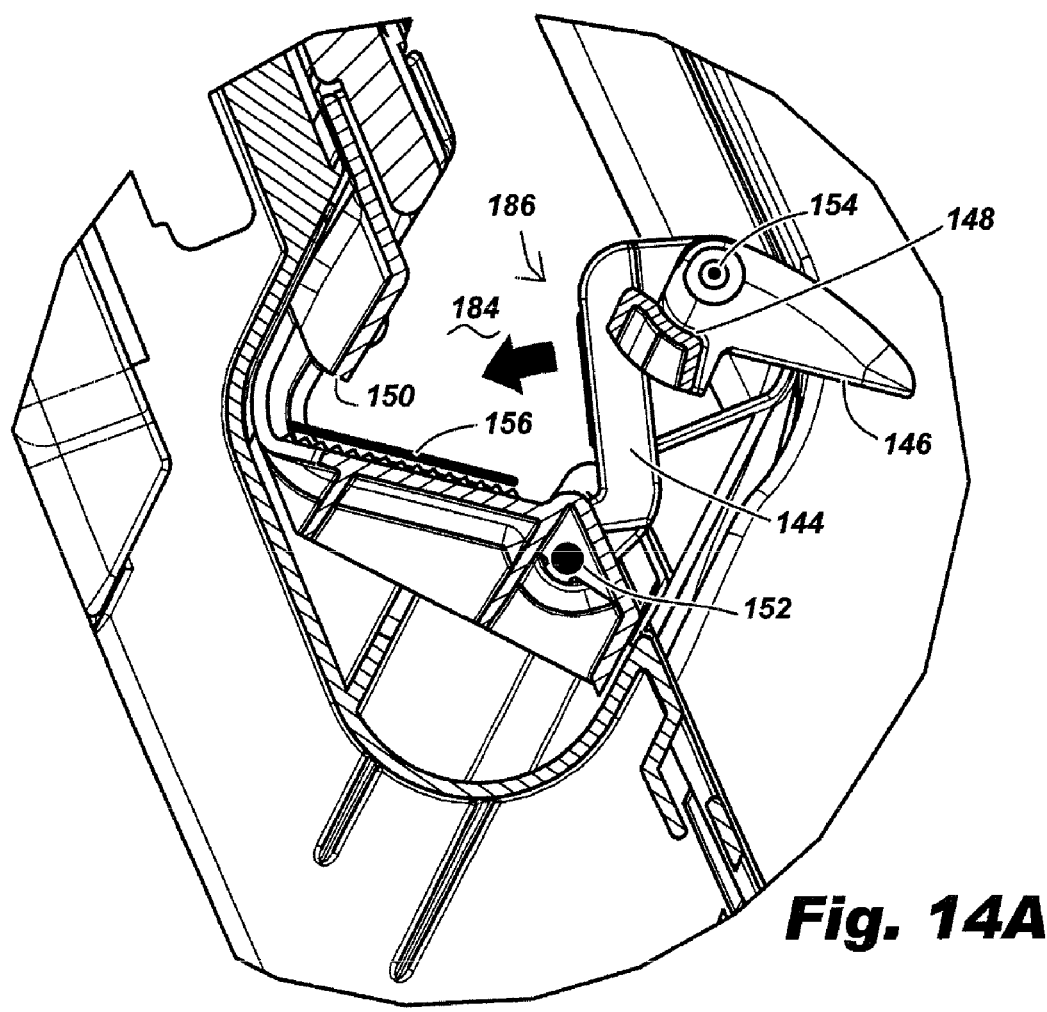
FIG. 14A is a cut-away view showing the forward facing belt path and belt clamp in the open position.
Figure 14B:
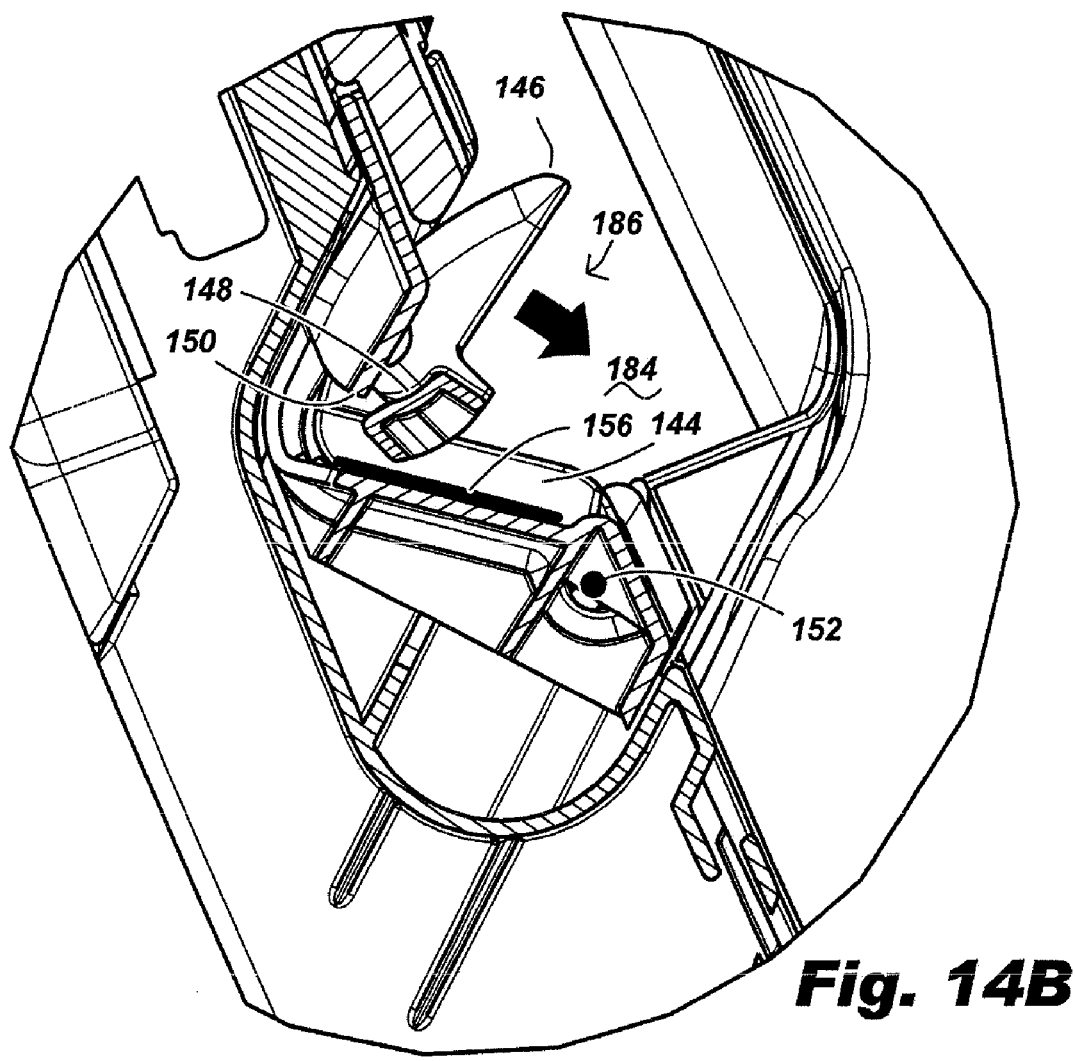
FIG. 14B is a cut-away view showing the forward facing belt path and belt clamp in the closed position with cam unlocked.
Figure 14C:
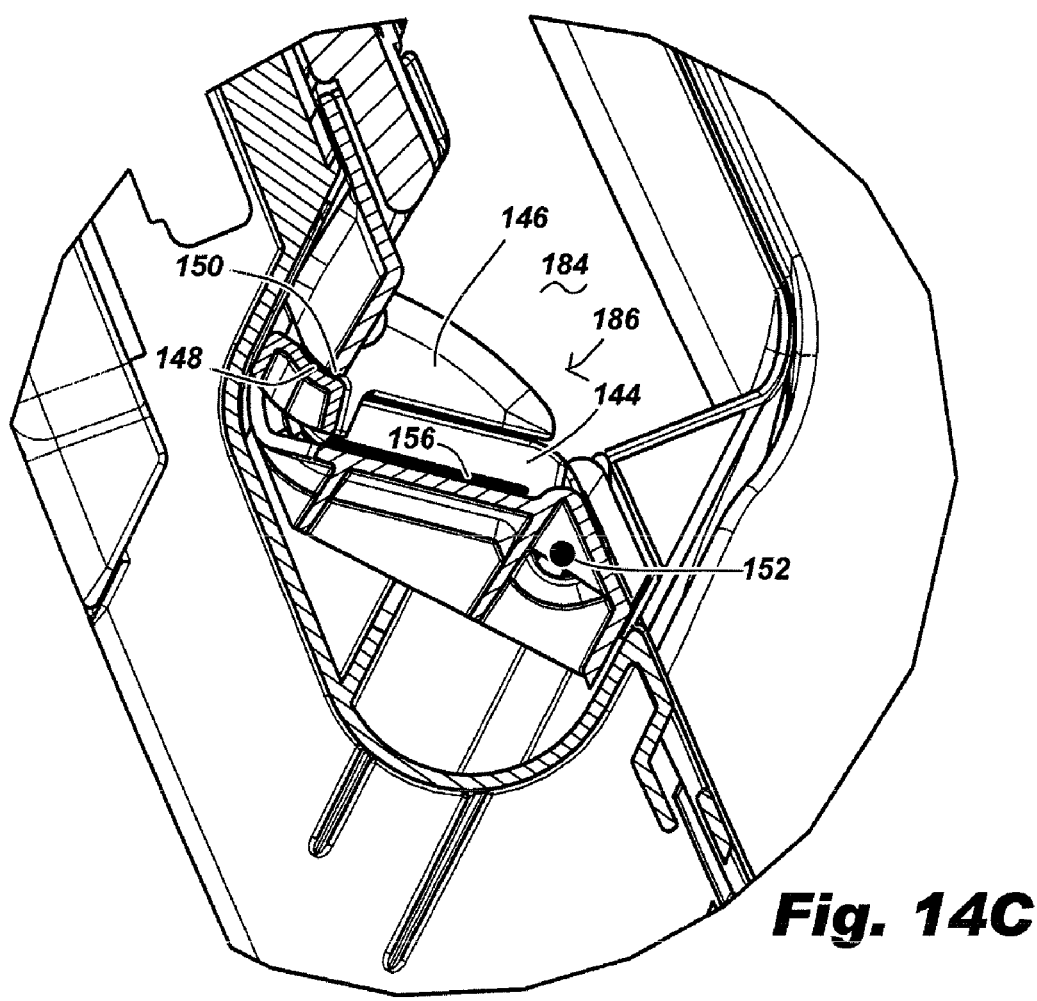
FIG. 14C is a cut-away view showing the forward facing belt path and belt clamp in the closed position with cam locked.

Forward facing belt path 184 incorporates an auto belt clamp 186 at its approximate center as shown in FIG. 1. FIG. 14A shows a side view of belt path 184 and belt clamp 186 with auto belt 156 threaded through belt path 184. Lock arm 144 is pivotally attached to the lower part of belt path 184 at axis 152 and is shown in an open position. Cam 146 is pivotally attached to lock arm 144 at axis 154 and includes locking lugs 148. Belt path 184 also includes locking ledges 150. FIG. 14B shows lock arm 144 closed against auto belt 156 with cam 146 in an unsecured position. FIG. 14C shows cam 146 closed against lock arm 144 with locking lugs 148 of cam 146 engaged under locking ledges 150 of belt path 140. Engagement of locking lugs 148 and ledges 150 prevent lock arm 144 from opening and maintains constant pressure on auto belt 156. To release lock arm 144, the user must rotate cam 146 upward, disengaging locking lugs 148 from locking ledges 150 so lock arm 144 can be rotated open, releasing pressure on auto belt 156, which can then be unthreaded from belt path 184.

Figure 3:
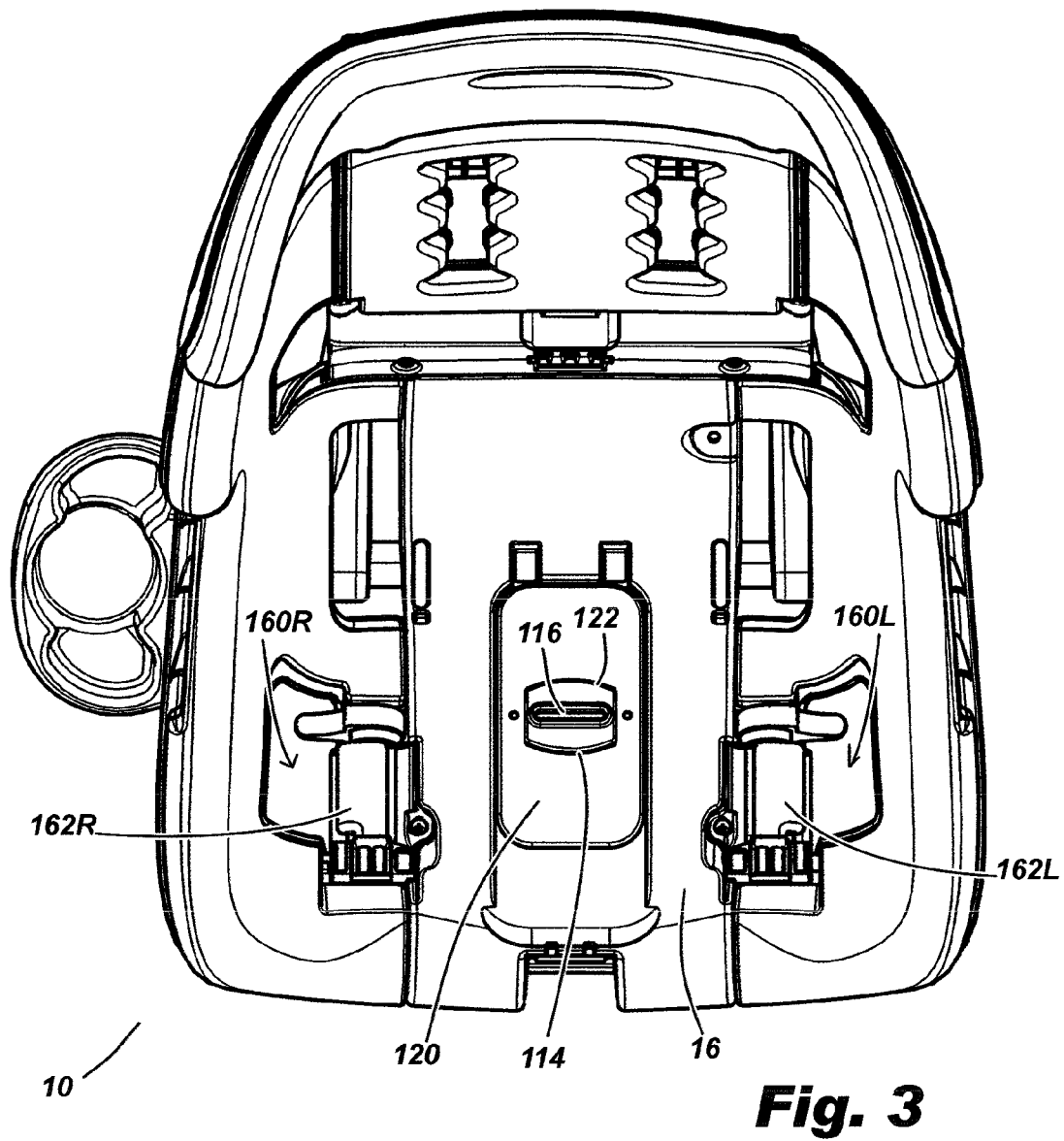
FIG. 3 is a top view of the convertible car seat in upright, forward facing configuration.
Figure 15A:
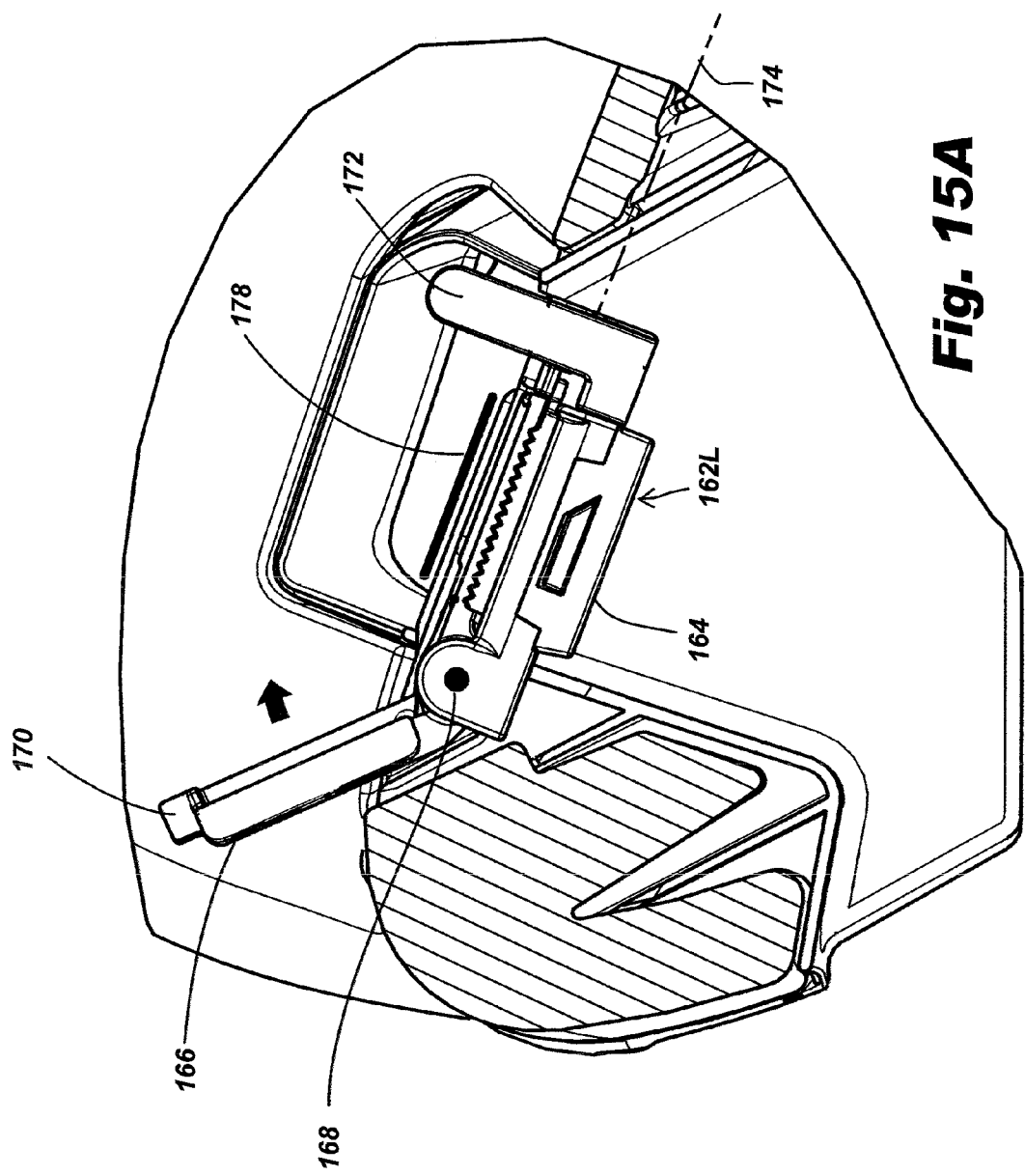
FIG. 15A is a cut-away view showing the left rear facing belt clamp in open position with cam unlocked.
Figure 15B:
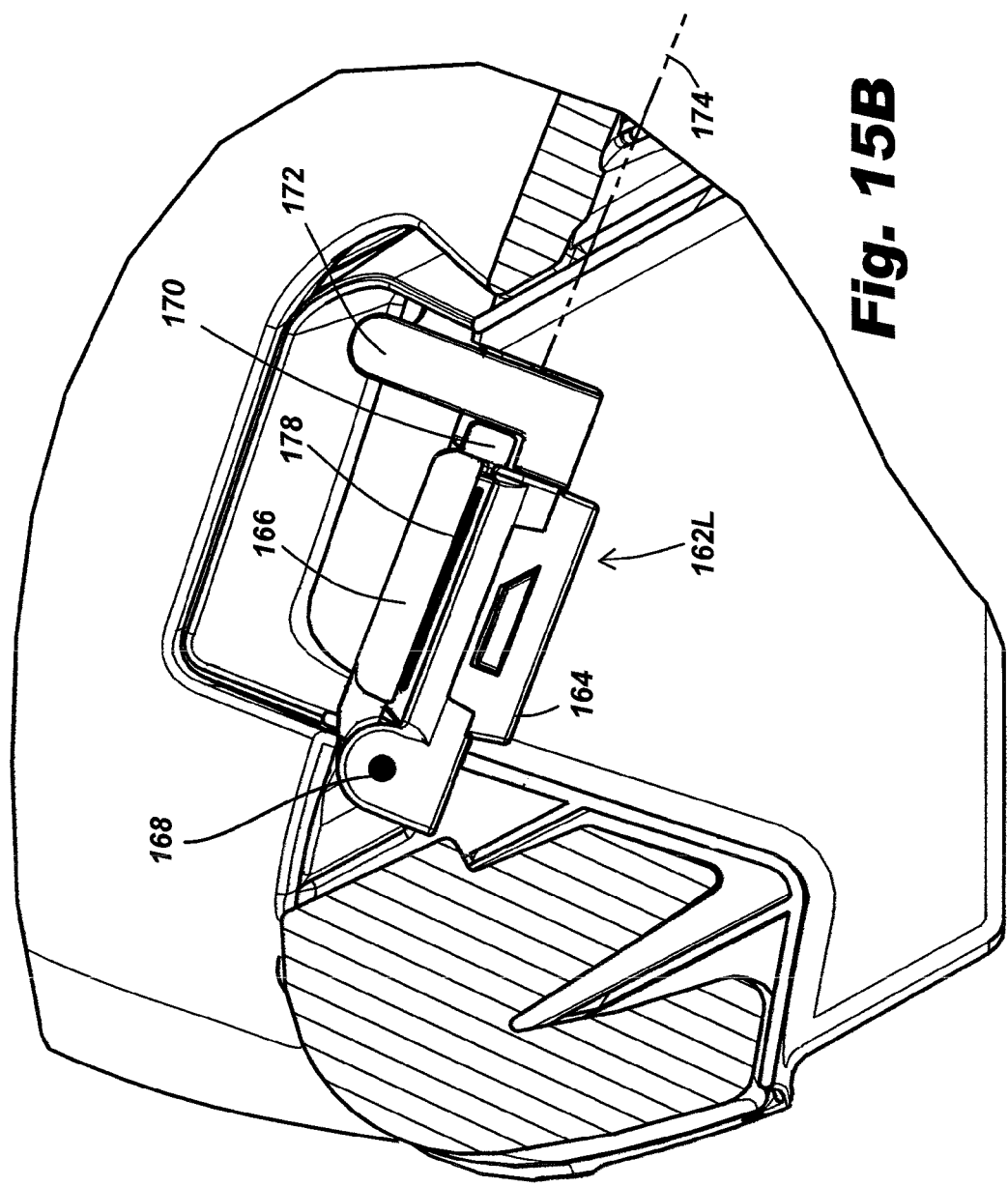
FIG. 15B is a cut-away view showing the left rear facing belt clamp in closed position with cam unlocked.
Figure 16B:
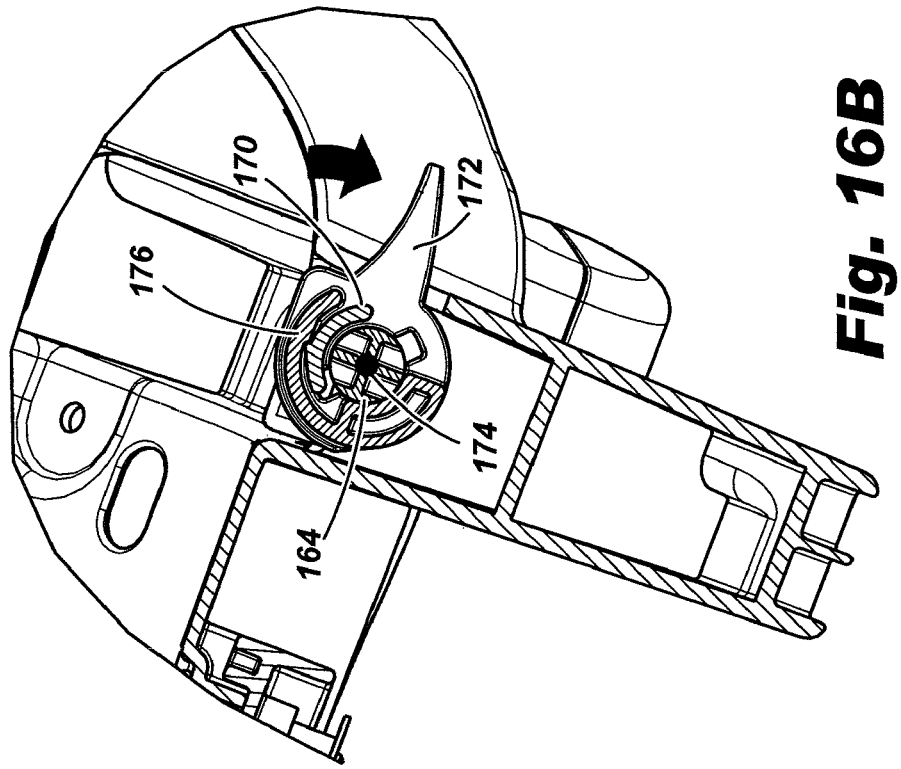
FIG. 16B is a cut-away section view through and normal to the left rear facing belt clamp showing it closed with the cam in locked position.
Figure 16A:
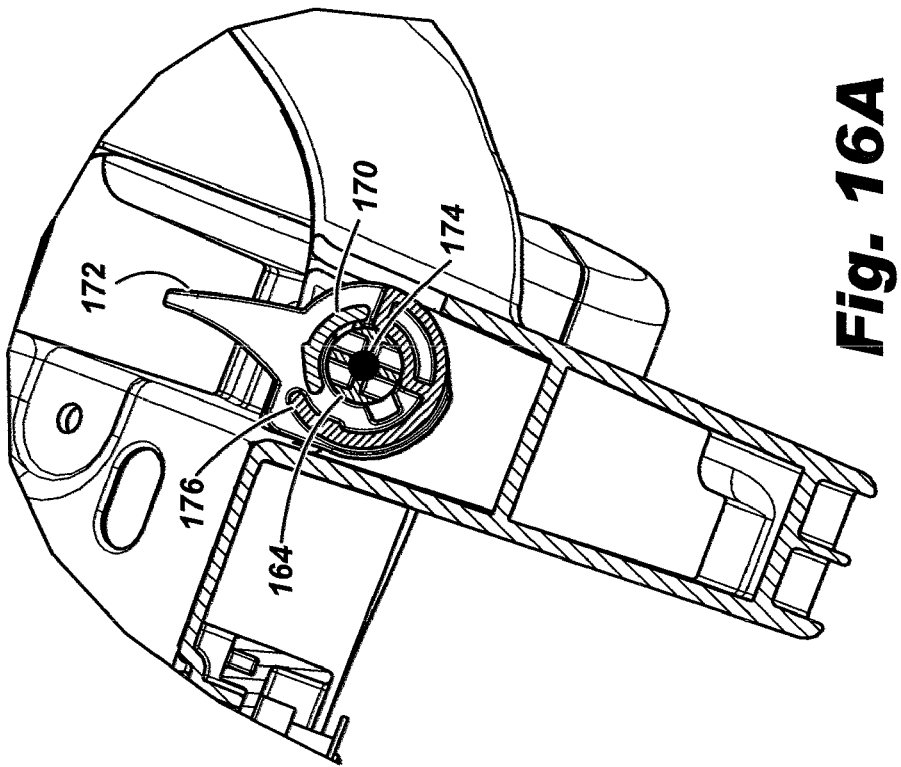
FIG. 16A is a cut-away section view through and normal to the left rear facing belt clamp showing it closed with the cam in unlocked position.

Openings 160R and 160L as shown in FIG. 3, establish a rear facing auto belt path for convertible car seat 10 with rear facing belt clamps 162R and 162L adjacent to openings 160R and 160L and generally flush with seating surface 16. FIG. 15A shows a side view of belt clamp 162L, that comprises a clamp base 164, lock arm 166 pivotally connected to the forward end of clamp base 164 at axis 168, cam 172 pivotally connected to the rear edge of clamp base 164, at axis 174 which is perpendicular to axis 168, and auto belt 178. Lock arm 166 is open and away from clamp base 164 and incorporates collar 170 on the end opposite axis 168. FIG. 15B shows lock arm 166 closed and against clamp base 164 and auto belt 178. FIG. 16A shows cam 172 in the unlocked position (as in FIG. 15B), with sleeve 176 of cam 172 in unsecured relationship to collar 170 on lock arm 166. Rotating cam 172 down as shown in FIG. 16B moves sleeve 176 over collar 170 of lock arm 166, securing lock arm 166 and maintaining constant pressure on auto belt 178.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described. This invention has been described in detail with reference to specific embodiments thereof, including the respective best modes for carrying out each embodiment. It shall be understood that these illustrations are by way of example and not by way of limitation.

What is claimed is:

1. A shoulder belt adjustment system for use in a car seat comprising:
   at least a pair of shoulder belts;
   a car seat shell, said shell having a seat portion and a back portion, said back portion having a pair of spaced apart car seat back portion longitudinal slots for threading of said shoulder belts of said harness therethrough;

a pair of rails positioned on a rear side of said back portion, said rails having a rail longitudinal slot extending along at least a portion of a side of said rails;

a moveable transverse adjustment beam between said rails and extending through said rail longitudinal slots, said beam controlling a height of said shoulder belts;

a beam securing means to maintain said beam at a desired location; and a pair of biased knobs at each end of and essentially axially co-linear with a longitudinal axis of said moveable transverse adjustment beam and exterior to said pair of rails, each of said knobs having a protrusion at least partially engaging said rail longitudinal slot for adjusting a height of said beam.

2. The shoulder belt adjustment system of claim 1 wherein said slots for threading of said shoulder belts have at least one hourglass shape.

3. The shoulder belt adjustment system of claim 2 wherein said beam securing means further comprises at least two recesses adjacent said rail longitudinal slots for mating engagement with a spring-biased tooth on a plunger handle at opposed ends of said moveable transverse beam.

4. The shoulder belt adjustment system of claim 3 wherein said beam securing means further comprises at least three recesses adjacent said rail longitudinal slots.

5. The shoulder belt adjustment system of claim 3 wherein said moveable transverse adjustment beam has a pair of beam slots to receive said shoulder belts, said beam slots in axial alignment with said spaced apart longitudinal slots in said back portion of said car seat shell, to receive said shoulder belts.

6. A convertible car seat for use as both an infant rear-facing car seat as well as for a toddler forward-facing car seat comprising:

a seat with a front and a back with contiguous left and right vertically extending sidewalls wherein said back and vertically extending sidewalls comprise a lower section;

said seat having a separable upper section secured to said seat by a securing means;

said seat having a recline stand which adjusts the angle of said back from a generally upright position for forward-facing use to an angled position for rearward-facing use, said recline stand having a pair of opposed first and second surfaces and rotatable essentially about a midpoint of a base underneath said seat from a first position in which said first surface is adjacent a bottom of said seat to a second position in which said second opposed surface is adjacent said bottom, said recline stand having an outwardly-biased sliding plunger which interfaces with an undersurface of said car seat shell and retains said recline stand either in said first or said second position and is movable therebetween by manual force to overcome said outward biasing of said plunger when moving said recline stand from said first to said second position; and wherein said upper section may be removed for rearward facing use causing a reduction in a distance measured from said front of said seat to a top of said seat.

7. The car seat of claim 6 wherein said separable upper section has a pair of headrest projections, each projection having at least one notch for securing engagement with a spring-biased tooth.

8. The car seat of claim 7 wherein each of said projections has at least two notches for securing engagement with said spring-biased tooth.

9. The car seat of claim 8 wherein each of said projections is a curvilinear rod.

10. A should belt adjustment system for use in a car seat comprising:

at least a pair of shoulder belts;

a car seat shell, said shell having a seat portion and a back portion, said back portion having a pair of spaced apart car seat back portion longitudinal slots for threading of said shoulder belts of said harness therethrough;

a pair of rails positioned on a rear side of said back portion, said rails having a rail longitudinal slot extending along at least a portion of a side of said rails;

a moveable transverse adjustment beam between said rails and extending through said rail longitudinal slots, said beam controlling a height of said shoulder belts; and a pair of inwardly-biased knobs at each end of and essentially axially co-linear with a longitudinal axis of said moveable transverse adjustment beam and exterior to said pair of rails, each of said knobs having a protrusion at least partially engaging said rail for maintaining a height of said beam.

11. The shoulder belt adjustment system of claim 10 wherein said slots for threading of said shoulder belts have at least one hourglass shape.

12. The shoulder belt adjustment system of claim 10 wherein said protrusion further comprises at least two recesses adjacent said rail longitudinal slots for mating engagement with a spring-biased tooth on a plunger handle at opposed ends of said moveable transverse beam.

13. The shoulder belt adjustment system of claim 10 wherein said protrusion mates with at least three recesses adjacent said rail longitudinal slots.

14. The shoulder belt adjustment system of claim 10 wherein said moveable transverse adjustment beam has a pair of beam slots to receive said shoulder belts, said beam slots in axial alignment with said spaced apart longitudinal slots in said back portion of said car seat shell, to receive said shoulder belts.

15. A convertible car seat for use as both an infant rear-facing car seat as well as for a toddler forward-facing car seat comprising:

a seat with a front and a back with contiguous left and right vertically extending sidewalls wherein said back and vertically extending sidewalls comprise a lower section;

said seat having a separable upper section having a pair of forward-extending wings and secured to said seat by a securing means, said wings and a top section of said sidewalls being essentially coplanar;

said seat having a recline stand which adjusts the angle of said back from a generally upright position for forward-facing use to an angled position for rearward-facing use, said recline stand having an outwardly-biased sliding plunger which interfaces with an undersurface of said car seat shell and retains said recline stand either in a first or a second position and is movable therebetween by manual force to overcome said outward biasing of said plunger when moving said recline stand from said first to said second position; and wherein said upper section may be removed for rearward facing use causing a reduction in a distance measured from said front of said seat to a top of said seat.

16. The car seat of claim 15 wherein
said separable upper section has a pair of headrest projections, at least one projection having at least one notch for securing engagement with a spring-biased tooth.

17. The car seat of claim 16 wherein
each of said projections has at least two notches for securing engagement with said spring-biased tooth.

18. The car seat of claim 15 wherein
each of said projections is a curvilinear rod.

19. A shoulder belt adjustment system for use in a car seat comprising:
at least a pair of shoulder belts;
a car seat shell, said shell having a seat portion and a back portion, said back portion having a pair of spaced apart car seat back portion longitudinal slots for threading of said shoulder belts of said harness therethrough;
a pair of rails positioned on a rear side of said back portion;
a moveable transverse adjustment beam between said rails, said beam controlling a height of said shoulder belts; and
an adjustment and securing means positioned at opposed ends of said transverse adjustment means and coaxial therewith and accessible from a front of said car seat and usable while an occupant is seated in said car seat, which upon user disengagement of said means, releases said means allowing movement of said transverse beam thereby controlling said height of said shoulder belts and upon user release of said means, allows re-engagement of said means, thereby securing said beam.

20. The shoulder belt adjustment system of claim 19, which further comprises:
a pair of inwardly-biased knobs at each end of said moveable transverse adjustment beam and exterior to said pair of rails, each of said knobs having a protrusion at least partially engaging said rail for maintaining a height of said beam.

21. The shoulder belt adjustment system of claim 20 wherein
said slots for threading of said shoulder belts have at least one hourglass shape.

22. The shoulder belt adjustment system of claim 20 wherein
said protrusion further comprises at least two recesses adjacent said rail longitudinal slots for mating engagement with a spring-biased tooth on a plunger handle at opposed ends of said moveable transverse beam.

23. The shoulder belt adjustment system of claim 20 wherein
said protrusion mates with at least three recesses adjacent said rail longitudinal slots.

* * * * *